United States Patent
Feltham

(10) Patent No.: US 12,459,331 B2
(45) Date of Patent: Nov. 4, 2025

(54) VEHICLE HVAC DRYING MODE

(71) Applicant: Rivian IP Holdings, LLC, Irvine, CA (US)

(72) Inventor: Graham Lloyd Feltham, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 478 days.

(21) Appl. No.: 17/866,133

(22) Filed: Jul. 15, 2022

(65) Prior Publication Data

US 2024/0017591 A1    Jan. 18, 2024

(51) Int. Cl.
*B60H 1/00* (2006.01)
*B60H 1/24* (2006.01)
*B60H 3/02* (2006.01)

(52) U.S. Cl.
CPC ..... *B60H 1/00785* (2013.01); *B60H 1/00742* (2013.01)

(58) Field of Classification Search
CPC .... B60H 1/00742; B60H 1/785; B60H 1/247; B60H 1/00785
See application file for complete search history.

(56) References Cited

U.S. PATENT DOCUMENTS

| | | | |
|---|---|---|---|
| 2017/0253201 A1* | 9/2017 | Maeshiro | H04N 23/20 |
| 2023/0191871 A1 | 6/2023 | Feltham et al. | |
| 2023/0191873 A1 | 6/2023 | Feltham | |

FOREIGN PATENT DOCUMENTS

| | | | | |
|---|---|---|---|---|
| CN | 108189726 A | * | 6/2018 | |
| CN | 110605952 A | * | 12/2019 | B60H 1/00742 |
| WO | WO-2022045900 A1 | * | 3/2022 | F24F 7/02 |

OTHER PUBLICATIONS

Zhao, CN108189726 and translation (Year: 2018).*
Translation of CN110605952 (Year: 2019).*

* cited by examiner

*Primary Examiner* — Steven S Anderson, II
(74) *Attorney, Agent, or Firm* — Haley Guiliano LLP

(57) ABSTRACT

Systems and methods are provided for implementing a heating, ventilation, and air conditioning (HVAC) system, and processing circuitry configured to determine to enter a drying mode, retrieve a parameter of the HVAC system for the drying mode, and cause the HVAC system to activate the drying mode to direct thermal energy to a particular portion of the vehicle based on the retrieved parameter.

20 Claims, 8 Drawing Sheets

VEHICLE HVAC DRYING MODE

INTRODUCTION

Many delivery drivers (e.g., employed or contracted by e-commerce companies) spend up to 10 hours per day, and 4-5 days a week, delivering packages to consumers or businesses. In performing these deliveries, the driver may encounter various thermal operating environments and conditions, e.g., the driver's clothing may become wet from stepping in a puddle, stream, kiddie-pool, snowbank, etc., and/or from being exposed to precipitation. Such wet clothing may impact mobility, dexterity as well as thermal comfort of the driver, and/or cause certain portions of the vehicle to become wet, and may negatively impact the driver's comfort, performance and driving experience.

SUMMARY

Accordingly, systems, vehicles and methods are disclosed herein for efficiently maintaining the thermal comfort of the driver. In some embodiments, a vehicle is provided which comprises a heating, ventilation, and air conditioning (HVAC) system, and processing circuitry configured to determine to enter a drying mode, retrieve a parameter of the HVAC system for the drying mode, and cause the HVAC system to activate the drying mode to direct thermal energy to a particular portion of the vehicle based on the retrieved parameter.

In some embodiments, the processing circuitry is further configured to determine, based on a received sensor input, that a seat of the vehicle is wet, wherein the particular portion of the vehicle comprises the seat. The processing circuitry may be further configured to cause the HVAC system to activate the drying mode to direct thermal energy by using the seat of the vehicle to direct the thermal energy.

In some embodiments, the processing circuitry is configured to determine that precipitation is occurring outside the vehicle, and determine that a user of the vehicle was exposed to the precipitation. The processing circuitry may be further configured to determine to enter the drying mode in response to determining that the user was exposed to the precipitation.

In some embodiments, the processing circuitry is further configured determine an ambient temperature outside the vehicle, and the particular portion of the vehicle is at least one of a seat of the vehicle, or a region of the vehicle that is in front of the seat and below a top of a seat cushion of the seat. In some embodiments, the parameter corresponds to a temperature setpoint of the thermal energy directed to the particular portion of the vehicle, and the temperature setpoint of the thermal energy directed to the particular portion of the vehicle during the drying mode may be based at least in part on the determined ambient temperature.

In some embodiments, the processing circuitry is further configured to determine a humidity level of air in an interior of the vehicle and retrieve the parameter of the HVAC system by retrieving, based on the determined humidity level, a humidity setpoint for the HVAC system. The processing circuitry may cause the HVAC system to activate the drying mode to direct thermal energy by modifying a current humidity setpoint of the HVAC system based on the retrieved humidity setpoint for the HVAC system to dry a material at the particular portion in a predetermined time period.

In some embodiments, the processing circuitry is further configured to determine one or more ambient conditions, and retrieve the parameter of the HVAC system by retrieving, based on the determined one or more ambient conditions, a temperature setpoint and a humidity setpoint. The processing circuitry may cause the HVAC system to activate the drying mode to direct thermal energy by applying the temperature setpoint and the humidity setpoint.

In some embodiments, the processing circuitry is further configured to provide one or more options for entering the drying mode, and determine to enter the drying mode in response to receiving a user request to enter the drying mode by receiving selection of one or more of the options.

In some embodiments, the one or more options comprise a first option and a second option, and the processing circuitry is configured to, in response to receiving selection of the first option, cause the HVAC system to activate the drying mode by directing thermal energy to feet of the user to dry socks or shoes of the user. The processing circuitry may be configured to, in response to receiving selection of the second option, cause the HVAC system to activate the drying mode by directing thermal energy to a chest of the user to dry a jacket or shirt of the user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
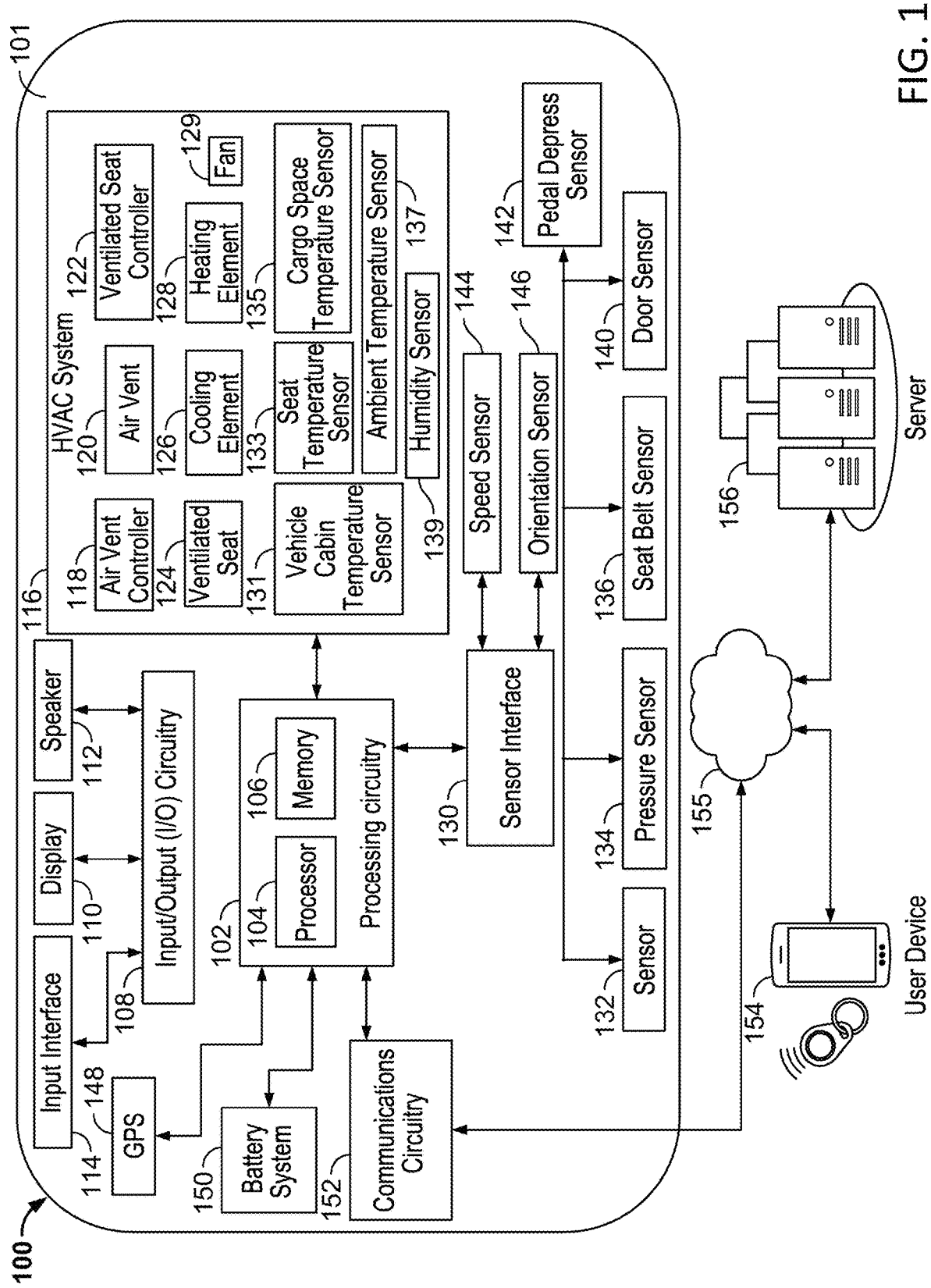
FIG. 1 shows a block diagram of an illustrative system for causing an HVAC system of a vehicle to activate a drying mode, in accordance with some embodiments of the present disclosure.

FIG. 1 shows a block diagram of an illustrative system 100 for causing an HVAC system of a vehicle to activate a drying mode, in accordance with some embodiments of the present disclosure. System 100 may comprise vehicle 101, one or more of user device 154 (e.g., a key fob; a mobile device, such as, for example, a smart phone or a tablet; or any other suitable computing device, such as, for example a laptop computer, a desktop computer; or any combination thereof) and cloud computing resources 156 (e.g., one or more remote servers, which may include and/or maintain and/or be in communication with one or more databases).

Such elements of system 100 may be configured to communicate over any suitable wireless communication path. For example, user device 154 may be configured to communicate with vehicle 101 over a short-range radio communication technique, such as, for example, Bluetooth or near-field communication (NFC) and/or any other suitable technique, and/or vehicle 101 may communicate with user device 154 and server 156 over network 155, e.g., the Internet, a local area network, a wide area network, a satellite network, a cellular network, or any other suitable network, or any combination thereof. In some embodiments, user device 154 may be configured to implement a mobile application (e.g., provided by and/or associated with a manufacturer of vehicle 101) that allows a user to access a user profile and specify certain settings or preferences of the user profile, e.g., preferred HVAC settings, preferred drying mode settings (e.g., one or more portions of vehicle 101 to which thermal energy may be directed during the drying mode, such as, for example, to dry such portions of vehicle 101 and/or to dry different portions of a vehicle occupant's body and/or to dry associated clothing), preferred thermal settings for a vehicle component (e.g., a ventilated seat or steering wheel, other any other suitable component) or any other suitable settings, or any combination thereof.

Vehicle 101 may be a car (e.g., a delivery truck, a delivery van, a delivery car, a coupe, a sedan, a truck, an SUV, a bus, or any other suitable type of car, or any combination thereof), a motorcycle, an aircraft (e.g., a drone, or any other suitable type of aircraft), a watercraft (e.g., a boat or any other suitable type of watercraft), or any other suitable type of vehicle, or any combination thereof. In some embodiments, vehicle 101 may be configured to operate autonomously or semi-autonomously. Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Processing circuitry 102 may be communicatively connected to components of vehicle 101 via one or more wires, or via wireless connection. In some embodiments, the processor 104 may include one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. Processing circuitry 102 may monitor sensor signals, generate control signals, execute computer readable instructions, receive inputs, perform any other suitable actions, or any combination thereof.

Memory 106 may comprise hardware elements for non-transitory storage of commands or instructions, that, when executed by processor 104, cause processor 104 to operate vehicle 101 in accordance with embodiments described above and below. Memory 106 may include any suitable storage device such as, for example, volatile memory, non-volatile memory, a removable storage device, a solid-state storage device, an optical device, a magnetic device, any other suitable component, or any combination thereof, for storing information.

Processing circuitry 102 may be communicatively connected to input interface 114 (e.g., a steering wheel, a touch screen display, buttons, knobs, a microphone or other audio capture device, or any other suitable input interface, or any combination thereof) via input/output (I/O) circuitry 108. In some embodiments, a driver or other occupant of vehicle 101 may be permitted to select certain settings in connection with the operation of vehicle 101 via input interface 114, e.g., thermal storage settings for a vehicle component, HVAC settings, or any other suitable settings, or any combination thereof. In some embodiments, a driver or other occupant of vehicle 101 may be permitted to request to enter the drying mode of vehicle 101 by way of input interface 114, e.g., via user selection of an icon on a touchscreen display on vehicle 101, via selection of a button or switch at a dashboard of vehicle 101, via voice command received by a microphone of vehicle 101, via tactile input, via user device 154, or via any other suitable input, or any combination thereof.

Processing circuitry 102 may be communicatively connected to display 110 and speaker 112 by way of I/O circuitry 108. Display 110 may be located at a dashboard of vehicle 101 and/or at a heads-up display at a windshield of vehicle 101, or at any other suitable location, or any combination thereof. Display 110 may comprise an LCD display, an OLED display, an LED display, or any other suitable type of display, or any combination thereof. Display 110 may be configured to display HVAC settings or parameters, options to enter a drying mode and/or options to specify parameters for the drying mode and/or selectable identifiers associated with user profiles of a particular user account or user account associated with vehicle 101, or any other suitable content, or any combination thereof. Speaker 112 may be located at any suitable location within vehicle 101, e.g., at a dashboard of vehicle 101, on an interior portion of the vehicle door, in a cargo portion of vehicle 101, or any combination thereof, and may be configured to provide audio output to a driver and/or occupant of vehicle 101.

Vehicle 101 may comprise HVAC system 116. Processing circuitry 102 may be communicatively connected to HVAC system 116. HVAC system 116 may comprise any of one or more of heating, ventilation, or air conditioning components, or any other suitable components, or any combination thereof, configured to provide thermal comfort to vehicle occupants and/or control humidity of air in an interior of vehicle 101. In some embodiments, HVAC system 116 may comprise one or more of a variety of components (e.g., a compressor, a condenser, a fan, valving (e.g., controllable and/or fixed), a blower, an evaporator, a radiator, heat exchangers, a heater (e.g., a positive temperature coefficient (PTC) heater or any other suitable heater or any suitable combination thereof), a chiller, an expansion valve, a recirculation system, an air mixing portion, or any other suitable component, or any combination thereof). In some embodiments, one or more of such components of HVAC system 116 may be configured to process a working fluid (e.g., any suitable refrigerant, coolant, or other fluid) and provide conditioned air (e.g., having its temperature and/or humidity modified) to any suitable portion of vehicle 101 and/or ventilated seat 124). Additionally or alternatively, HVAC system 116 may comprise ventilation elements, e.g., use fans, blowers or ducts to circulate air and/or bring fresh air inside vehicle 101, where such air may or may not be conditioned, and/or may be used to reduce moisture of air within vehicle 101. In some embodiments, HVAC system 116 may employ any suitable sensor, e.g., current sensors (e.g., of a compressor motor) to measure an output power of HVAC system 116. In some circumstances, HVAC system 116 may be configured to provide heating and ventilation, without providing air conditioning; in some circumstances, HVAC system 116 may be configured to provide air conditioning and ventilation, without providing heating.

HVAC system 116 may be configured to provide cabin cooling (e.g., air conditioning), heating, defrosting, venting, or any suitable combination thereof. HVAC system 116 may include a blower fan, ducting, plenums, dampers or diversion valves, filters, intakes, one or more input interfaces (e.g., knobs, hard buttons, soft buttons, touchscreen interfaces, voice interfaces), a controller, any other suitable components, or any combination thereof. HVAC system 116 may comprise air vent controller 118, air vent 120, ventilated seat controller 122, ventilated seat 124, cooling element 126, heating element 128, fan 129, vehicle cabin temperature sensor 131, seat temperature sensor 133, cargo space temperature sensor 135, ambient temperature sensor 137, humidity sensor 139, and/or any other suitable components, or any combination thereof. Although only a single component for such elements is shown, HVAC system 116 may include any number of such components. In some embodiments, air vent controller 118 and/or ventilated seat controller 122 may be implemented in a similar manner as processing circuitry 102.

HVAC system 116 may comprise one or more air vents 120. Processing circuitry 102 may be communicatively connected (e.g., via air vent controller 118) to air vent 120. Air vent 120 may be configured to direct conditioned air from HVAC system 116 to different portions of vehicle 101 (e.g., a vehicle cabin, a vehicle cargo space, a vehicle seat, an interior portion of the vehicle in a vicinity of a floor near a bottom portion of a vehicle seat such as, for example, the floor adjacent to a driver's seat, or any other suitable portions of vehicle 101, or any combination thereof). In some embodiments, air vent 120 may include fins which may be moved (e.g., rotated or translated) via at least one motor or actuator. In some embodiments, fins of the vent can be oriented to direct air from the vent into any suitable direction inside vehicle 101.

In some embodiments, air vent controller 118 and/or ventilated seat controller 122 and/or processing circuitry 102 may be configured to retrieve one or more parameters of the HVAC system 116 for a drying mode. The drying mode may be understood as a specifically calibrated mode to direct thermal energy towards particular portion(s) of vehicle 101, to enable materials (e.g., certain articles of clothing, towels, blankets, hats or any other suitable material) and/or persons (e.g., a driver, a passenger, vehicle occupants, etc.) and/or animals (e.g., pets) present at such particular portion(s) to be rapidly dried, and/or to enable air in a vicinity thereof to be conditioned. In some embodiments, the drying mode may additionally or alternatively be utilized to cause HVAC system 116 to direct thermal energy by using particular portion(s) of vehicle 101 and/or certain components of vehicle 101. For example, processing circuitry 102 may cause the HVAC system to activate the drying mode to direct thermal energy by using seat 124, a steering wheel of vehicle 101, an example of input interface 114, or any other suitable component, or any combination thereof, of vehicle 101 to direct the thermal energy. In some embodiments, the presence or absence of a user or other materials may be taken into account when determining whether to use a particular portion or component of vehicle 101 to direct thermal energy, or such portion(s) may be used to direct thermal energy even in the absence of any materials or occupants or animals being present at such portion(s) of vehicle 101.

In some embodiments, the drying mode may be activated in response to receiving a user selection to enter such mode, e.g., via a single button push received via display 110, such as, for example, on an XMM screen of an HVAC tab, or a dashboard of vehicle 101, or at user device 154 (e.g., when the user is inside or outside the vehicle), a voice command received via input interface 114 (e.g., a microphone) or user device 154, or any other suitable input, or any combination thereof. For example, the user may decide to activate such mode if the user has just returned to the car after stepping in a puddle or being caught in the rain, or if the user is about to exit the vehicle to perform a delivery and anticipates being wet upon his or her return to the vehicle (e.g., due to current weather conditions such as ongoing precipitation being observed by the user), is not wearing waterproof clothing, or any other suitable motivation, or any combination thereof.

In some embodiments, HVAC system 116 may be caused by processing circuitry 102 or any other suitable controller 118, 122 to automatically enter the drying mode, e.g., regardless of whether user input is received requesting to enter the drying mode. For example, HVAC system 116 may automatically enter the drying mode upon processing circuitry 102 and/or HVAC system 116 determining that weather conditions indicate on-going or imminent precipitation and/or extreme weather, and/or based on receiving sensor signals indicating that a vehicle component and/or other object or material in vehicle 101 or occupant in vehicle 101 is wet. For example, HVAC system 116 may determine, based on sensor signals received from precipitation sensor 141, which may be positioned at a windshield of vehicle 101 or any other suitable location, that the current weather corresponds to rain, snow, sleet, hail, etc., and thus it may be desirable to activate the drying mode to direct thermal energy at one or more portions of vehicle 101 (e.g., to direct thermal energy to feet of a user and/or a portion of the user's body in contact or near seat 124), and/or to use a vehicle component to direct the thermal energy. In some embodiments, precipitation sensor 141 may be a rain-light sensor or rain sensor. In some embodiments, precipitation sensor 141 may be an optical sensor, infrared sensor, an ultrasound sensor, or any other suitable sensor or any combination thereof. As an example, precipitation sensor 141 may measure an amount of light reflected from the windshield to precipitation sensor 141, where less light being reflected than a threshold, or a change in the amount of reflected light measured by precipitation sensor 141, may indicate that raindrops and/or other precipitation is present on the windshield, as the raindrops may divert the path of light from returning to the sensor. In some embodiments, the drying mode may be triggered upon determining that precipitation is currently heavy, e.g., based on readings of precipitation sensor 141.

As another example, water sensor 143 may be included in or around particular portions of vehicle 101 and/or vehicle components, such as seat 124 (e.g., at a seat back 311 and/or seat bottom cushion 309) and/or at a floor in a vicinity of a seat, to determine whether water is present in or around seat 124 or in or around any other suitable particular portion of vehicle 101. The drying mode may be automatically triggered at a particular portion of vehicle 101 if water is determined to be present (e.g., if any water is detected at all, or water is detected to be above a threshold amount) at the particular portion of vehicle 101. In some embodiments, water sensor 143 may detect the presence of water based on measuring a decreased resistance between two electrodes, e.g., based on the electrical conductivity of water, or water sensor 143 may be capacitance-based such that a change in capacitance may indicate the presence of water, or any other suitable water or wet sensor may be employed. Additionally or alternatively, vehicle 101 may determine, based on signals from ambient temperature sensor 137 and/or weather information received from server 156 and/or weather information received from user device 154, that an occupant is likely to be wet (e.g., based on forecasted or current precipitation, or due to hot temperatures and/or high humidity such that the user is likely to perspire while the user is out of the vehicle), and may automatically trigger the drying mode based on such information. In some embodiments, HVAC system 116 and/or processing circuitry 102 may cause a notification to be provided to a user indicating that the drying mode has been automatically entered, and may provide an option to the user to exit the drying mode or specify whether the drying mode should be automatically entered in future instances.

In some embodiments, HVAC system 116 may take into account a location of a user, in conjunction with the determined ambient conditions, in determining whether to automatically trigger the activation of the drying mode. For example, HVAC system 116 may take into account, based on signals from any suitable sensor(s), whether a user was or is currently outside vehicle 101, e.g., in rainy conditions, and has now returned to vehicle 101, and thus may benefit from the drying mode being automatically activated at one or more portions of vehicle 101 upon his or her return, or prior to his or her return (in likely wet clothing) and/or to dry an already wet seat 124 or other vehicle portion. For example, if processing circuitry 102 and/or HVAC system 116 receives an indication that precipitation sensor 141 has detected currently occurring precipitation (or in some cases, imminent or recent precipitation), processing circuitry 102 and/or HVAC system 116 may determine that a user was exposed to precipitation. For example, a user may be determined as having been exposed to precipitation if user is detected to currently be outside vehicle 101 and thus exposed to the precipitation, or is detected to have recently been outside vehicle 101 and thus exposed to the precipitation and may now have returned to vehicle 101. In such an instance, processing circuitry 102 may cause HVAC system 116 to enter the drying mode in response to determining that the user was exposed to the precipitation. In some embodiments, images of the environment outside vehicle 101 may be captured and processed, e.g., to identify potential puddles near the vehicle or other conditions suggesting the user's clothing may become wet upon his or her return, such as, for example, after a delivery, or based on any other suitable factor, or any combination thereof, and the drying mode may be activated based at least in part on such processed images.

In some embodiments, the drying mode, when activated, may be configured to direct thermal energy to different portions of the vehicle, e.g., using air vents 120 and/or using particular components of vehicle 101, e.g., via ventilated seat 124. For example, the drying mode may correspond to drying, and/or conditioning air in a vicinity of, feet of the user to dry socks or shoes of the user. In such an instance, the thermal energy may be directed to a region of vehicle 101 in a vicinity of the floor or floormat of a driver, occupant or passenger seat of vehicle 101, e.g., a region of vehicle 101 that is in front of seat 124 and below a top of a seat cushion of seat 124. As another example, the drying mode may correspond to drying, and/or conditioning air in a vicinity of, a chest of the user to dry jacket or shirt of the user, and the thermal energy may be directed to seat back 311 and/or seat bottom cushion 309, of a driver seat, occupant seat or passenger seat of the vehicle. Such drying mode may be configured to dry, and/or condition air in a vicinity of, pants or shorts or a bathing suit of the user. In some embodiments, a single option may correspond to a single drying mode, or each drying mode may correspond to a respective option, or an option may activate all or a subset of the drying modes. For example, vehicle 101 and/or user device 154 may include a dedicated button or option selectable to enter the foot drying mode (e.g., to dry a user's shoes and/or socks and/or feet), a dedicated button selectable to enter the body drying mode (e.g., to dry a user's jacket and/or shirt and/or torso), a dedicated button selectable to enter the body drying mode (e.g., to dry a pants and/or shorts and/or lower body), and any other button or option associated with any suitable drying mode. In some embodiments, the drying mode may be operable to dry any suitable material, e.g., towels, blankets, hats, or occupant (e.g., persons or pets) which the user may place in a desired portion of vehicle 101, and select an option to activate a drying mode corresponding to such portion. In some embodiments, the drying mode may be automatically entered based on one or more sensor inputs, e.g., indicating that a particular portion of vehicle 101 is wet and/or detecting the presence and/or wetness of an object or material or person or animal at such particular portion of the vehicle 101.

In some embodiments, the one or more parameters of HVAC system 116 retrieved for the drying mode may correspond to particular setpoints for one or more of temperature, flow rate, humidity, air flow direction, or any other suitable parameter, or any combination thereof. In some embodiments, as part of the drying mode, air vent controller 118 and/or ventilated seat controller 122 and/or processing circuitry 102 may be configured to determine the current HVAC system parameters (e.g., current setpoints for one or more of temperature, flow rate, humidity, air flow direction, or any other suitable parameter, or any combination thereof). The drying mode may further comprise air vent controller 118 and/or ventilated seat controller 122 and/or processing circuitry 102 causing HVAC system 116 to modify or adjust such current HVAC system parameters based on the one or more parameters of the HVAC system retrieved for the drying mode. In some embodiments, the one or more parameters of HVAC system 116 retrieved for the drying mode may depend on current ambient conditions, inside and/or outside vehicle 101. In some embodiments, the one or more retrieved setpoints of the drying mode may correspond to a desired or target value of a parameter to be detected within vehicle 101, or a desired or target value of a parameter to be output by HVAC system 116, and such one or more retrieved setpoints may be selected based on current ambient conditions (e.g., humidity and/or temperature measurements within vehicle 101, and/or humidity and/or temperature measurements outside vehicle 101).

As an example, an evaporator of HVAC system 116 may be employed in conjunction with a blower to dry air and reduce humidity in a vehicle cabin as part of the drying mode, e.g., until a desired humidity setpoint, which may be specified by the drying mode for the current ambient conditions, is detected within vehicle 101 or is output by HVAC system 116 for a certain period of time. Additionally or alternatively, a heater, e.g., heating element 128, may be configured to provide hot air as part of the drying mode to a suitable portion of the vehicle at a particular temperature and/or flow rate, e.g., at which the user's clothing may be situated, in accordance with a temperature setpoint and/or a flow rate setpoint for the drying mode given the current ambient conditions, and/or a fan blower may be configured to blow air towards a specific portion of the vehicle and/or clothing or body part of the user. In some embodiments, the drying mode may indicate a predetermined period of time during which the drying mode should be maintained (e.g., to dry the material or item or occupant), where such period of time may be based on determined ambient conditions and/or other sensor inputs. In some embodiments, such one or more parameters of HVAC system 116 may be retrieved, and the adjustment of the current HVAC parameters may be performed, while the user is present in the vehicle, and/or while the user is outside the vehicle, e.g., the user may activate the drying mode prior to exiting the vehicle or while outside the vehicle, e.g., via a mobile device, or the drying mode may be automatically entered.

In some embodiments, the drying mode may be applied within vehicle 101 for a predetermined period of time, the duration of which may depend on one or more factors. For example, processing circuitry 102 may reference a lookup table storing relationships between a duration of the drying mode and current ambient conditions, e.g., a higher humidity level being measured may indicate a longer period of time for the drying mode is needed to dry material(s) as compared to when a lower humidity level is measured. In some embodiments, the predetermined period of time may correspond to a period of time required to cause a setpoint within vehicle 101 to reach a target value, or a period of time for which a setpoint of a parameter output by HVAC system 116 should be applied at a certain value. Additionally or alternatively, if a material (e.g., seat 124 or clothing of a user and/or any other suitable material) is determined to be of a particular wetness, the predetermined period of time may be indicated in the lookup table and may correspond to a period of time to dry the particular material having the determined wetness level. For example, a high wetness level may suggest that more time is needed for the drying mode. As another example, the user may be prompted to indicate when he or she wishes to exit the drying mode such as when he or she is satisfied with the extent of the drying.

In some embodiments, the drying mode may comprise processing circuitry 102 causing (e.g., directly or via ventilated seat controller 122) ventilated seat 124 to begin storing more thermal energy than was being stored prior to entering the drying mode. In some embodiments, ventilated seat 124 may not be storing thermal energy at all prior to processing circuitry 102 entering the drying mode, or, or may be storing an amount of energy that is determined to be insufficient for the drying mode, and adjustment may be performed based on one or more of the retrieved parameters for the drying mode until at least a particular setpoint is met. In some embodiments, such adjustment may be based on a selection received from a user, e.g., via user device 154 and/or received via I/O circuitry 108 of vehicle 101, of a specific temperature value or setting associated with ventilated seat 124. Additionally or alternatively, the adjustment of the thermal energy to be directed to ventilated seat 124 may be performed automatically, e.g., based on determining that ventilated seat 124 is wet, or is in contact with items or materials or clothing determined to be wet.

Ventilated seat 124 for vehicle 101 may be configured (e.g., via ventilated seat controller 122, which may be communicatively connected to processing circuitry 102) to provide thermal comfort, e.g., heating or cooling, to a vehicle occupant that is sitting or otherwise located at ventilated seat 124. In some embodiments, ventilated seat 124 may comprise a seat cushion assembly (e.g., a bottom cushion 309 and/or a seat back rest cushion 311 of FIG. 3) and an air duct configured to provide conditioned air, from HVAC system 116 to the seat cushion assembly. In some embodiments, ventilated seat 124 may comprise heating element 128, which may be configured to provide heating to an occupant of ventilated seat 124, e.g., by applying electric current through a wire or coil of heating element 128 to generate heat. In some embodiments, cooling may be provided to ventilated seat 124 via cooling element 126, which may utilize working fluids or refrigerant to provide such cooling. In some embodiments, ventilated seat 124 may comprise or be associated with seat temperature sensor 133, which may be configured to measure a temperature in one or more portions of ventilated seat 124. In some embodiments, one or more of fan 129, a blower, or a duct, or any other suitable equipment, or any combination thereof, may be disposed within ventilated seat 124 to heat or cool ventilated seat 124. For example, air may be configured to pass through small perforations or pores of seat 124, and/or modify a moisture or humidity level of the air. In some embodiments, one or more portions of HVAC system 116 may be connected to ventilated seat 124 via a duct, or any other suitable conduit, as discussed in more detail in commonly-owned application Ser. No. 17/390,710 to Feltham et al., the contents of which are hereby incorporated by reference herein in their entirety. For example, such aspects may allow humidity associated with ventilated seat 124 to be adjusted in accordance with a setpoint of the drying mode. In some embodiments, humidity associated with ventilated seat 124 may not be adjustable as part of the drying mode.

In some embodiments, ventilated seat 124 may comprise components or layers, e.g., porous materials, seat heaters, air channels, and any other suitable components or layers, or any combination thereof. In some embodiments, such as during the drying mode, during a no-sit condition (e.g., the user not being present in seat 124), a maximum flow rate possible may be applied (e.g., to dry a wet seat while the occupant is outside the vehicle but the vehicle HVAC system 116 is still turned on), which may enable the seat to dry and/or cool quickly to facilitate removing residual sweat or rainwater through accelerated evaporation, e.g., an auto-dry function). The user may activate such mode prior to exiting vehicle 101 or such mode may be automatically entered upon processing circuitry 102 and/or HVAC system 116 detecting moisture and/or water on seat 124 via water sensor 143, and/or upon detecting moisture and/or water at any other suitable component of vehicle 101, and/or upon detecting that the user is outside or has returned to vehicle 101.

Vehicle cabin temperature sensor 131 may be configured to monitor a temperature of a cabin portion of vehicle 101, cargo space temperature sensor 135 may be configured to monitor a temperature of a cargo space portion of vehicle 101, and ambient temperature sensor 137 may be configured to monitor an ambient temperature of an environment outside vehicle 101 (and/or within vehicle 101). In some embodiments, temperature sensors 131, 133, 135, 137 may comprise a thermocouple, thermistor, resistance temperature detector, or optical sensor, or any suitable combination thereof. In some embodiments, HVAC system 116 may comprise sensors configured to measure temperature of a component (e.g., a heat exchanger, a chiller, a compressor), a fluid (e.g., air, coolant, or refrigerant), or a combination thereof. In some embodiments, HVAC system 116 may comprise sensors configured to measure pressure or a difference in pressure of a fluid (e.g., air, coolant, or refrigerant). In some embodiments, HVAC system 116 may comprise sensors configured to measure a flow rate in air, coolant, or refrigerant (e.g., to determine a cooling or heating rate).

Humidity sensor 139 may be configured to determine a current humidity level within a cabin of vehicle 101 (and/or outside vehicle 101), and may correspond to any suitable sensor or device configured to measure an absolute humidity, the amount of water vapor in the air of vehicle 101 (or a specific portion of vehicle 101), and/or a relative humidity, the amount of water vapor or moisture in the air expressed as a fraction or percentage of a maximum humidity at a given temperature, and/or a specific humidity. In some embodiments, humidity sensor 139 may be capacitive-based, resistive-based, thermal-based, or may be of any other suitable type, or any combination thereof. In some embodiments, based on the value output by humidity sensor 139, HVAC parameters may be adjusted in accordance with parameters or setpoints of the drying mode. For example, an evaporator and/or blower of HVAC system 116 may be used to dehumidify the air of a cabin of vehicle 101, based on the parameters of the particular drying mode having been activated, where such dehumidification may also cause cooling of the vehicle cabin or portions thereof.

Processing circuitry 102 may be communicatively connected (e.g., by way of sensor interface 130) to sensor 132, pressure sensor 134, seat belt sensor 136, door sensor 140, pedal depress sensor 142, speed sensor 144, orientation sensor 146, precipitation sensor 141, water sensor 143 and/or any other suitable sensor, and/or any suitable combination thereof. Sensor 132 may comprise one or more image sensors (e.g., a CMOS or CCD) configured to capture an internal or external environment of vehicle 101. Pressure sensor 134 (e.g., piezo or strain-based transducers) may be an occupant detection sensor positioned at one or more vehicle seats (e.g., ventilated seat 124) and may be configured to sense whether a vehicle occupant is present in a vehicle seat. Seat belt sensor 136 may be configured to output a signal to processing circuitry 102 (e.g., via sensor interface 130) indicative of whether a seat belt of a vehicle occupant is engaged or buckled. Door sensor 140 may be configured to output a signal to processing circuitry 102 (e.g., via sensor interface 130) indicative of whether a door of vehicle 101 is open or closed, or partially open. Pedal depress sensor 142 may be configured to output a signal to processing circuitry 102 (e.g., via sensor interface 130) indicative of whether a brake pedal or accelerator pedal is depressed. Such sensor outputs may be utilized by processing circuitry 102 to determine whether a vehicle occupant is present in a vehicle seat of vehicle 101, or any other suitable portion of vehicle 101, or any combination thereof. In some embodiments, a current vehicle state (e.g., park or in drive) may be utilized to infer a location of the vehicle occupant. In some embodiments, determining that one or more actions (e.g., putting the vehicle is park, taking off seat belt) have been performed may trigger a cargo door to be automatically opened (e.g., to enable the vehicle occupant to retrieve a package for delivery). In some embodiments, one or more of such sensor signals may be used as a signal that a vehicle occupant is inside or outside the vehicle, which may be taken into account by the drying mode.

Orientation sensor 146 may be an inclinometer, an accelerometer, a tiltmeter, any other pitch sensor, or any combination thereof and may be configured to provide vehicle 101 orientation values (e.g., vehicle's pitch and/or vehicle's roll) to processing circuitry 102. Speed sensor 144 may be one of a speedometer, a GPS sensor, a rotary encoder, or the like, or any combination thereof, and may be configured to provide a reading of the vehicle's current speed to processing circuitry 102. Such sensor outputs may be used to determine whether vehicle 101 is being operated or is stopped.

Processing circuitry 102 may be communicatively connected to communications circuitry 152. Communications circuitry 152 may comprise any suitable hardware and/or software operable to send and receive wired and/or wireless signals between vehicle 101 and external devices such as, for example, network or user devices (e.g., user device 154, server 156, and/or a Wi-Fi access point and/or a satellite) and/or any other suitable computing devices. Communications circuitry 152 may include an antenna and other control circuitry (e.g., protocol converters, rate converters, signal converters), or any combination thereof.

Processing circuitry 102 may be communicatively connected to battery system 150, which may be configured to provide power to one or more of the components of vehicle 101 during operation. In some embodiments, vehicle 101 may be an electric vehicle or a hybrid electric vehicle, and/or may be configured to be an autonomous or semi-autonomous vehicle. Processing circuitry 102 may be communicatively connected to GPS system 148 or other positioning device of vehicle 101, where the driver or operator may interact with GPS system 148 via input interface 114. GPS system 148 may be in communication with (e.g., via communications circuitry 152) one or more satellites and/or servers remote from vehicle 101 to ascertain a location of vehicle 101 and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with vehicle 101 (e.g., a location of a home of the user stored in memory 106), or any other suitable form, or any combination thereof.

It should be appreciated that FIG. 1 only shows some of the components of vehicle 101, and it will be understood that vehicle 101 also includes other elements commonly found in vehicles (e.g., electric vehicles or any other suitable vehicle), e.g., a motor, brakes, wheels, wheel controls, turn signals, windows, doors, etc.

User device 154 may be, for example, a smartphone, tablet or any suitable personal computing device operable to communicate with vehicle 101 and server 156, via wireless network or wired connection (e.g., via a USB connection or other data cable). In some embodiments, user device 154 may be a key fob comprising a number of buttons (e.g., two, three, four, or more than four buttons) that respectively correspond to a function or command. Such key fob may include a battery to provide electrical power, an antenna for transmitting and receiving signals, and processing circuitry to convert user selections (e.g., presses of a button) to an electrical signal which may then be converted to a wireless signal (e.g., via the antenna). In some embodiments, user device 154 may comprise a proximity sensor associated with, e.g., an RFID tag, or other positioning sensor, which may enable processing circuitry to ascertain a location of a vehicle occupant associated with user device 154.

Server 156 may comprise a plurality of servers configured to remotely provide cloud computing resources (e.g., storage, processing, software applications, etc.) to other components of system 100, e.g., user device 154, vehicle 101, and/or any other suitable component. Server 156 may be configured to maintain one or more databases. In some embodiments, server 156 may be associated with a manufacturer or purchaser of vehicle 101, and may be configured to store (e.g., a cloud-based storage system or a database associated with server 156) information related to each vehicle sold by the manufacturer and related to an owner of each vehicle, e.g., login credentials associated with a user account and/or user profile of the vehicle owner with the manufacturer. In some embodiments, server 156 may comprise a collection of servers, and processing circuitry of server 156 can be distributed across a number of servers.

Figure 2:
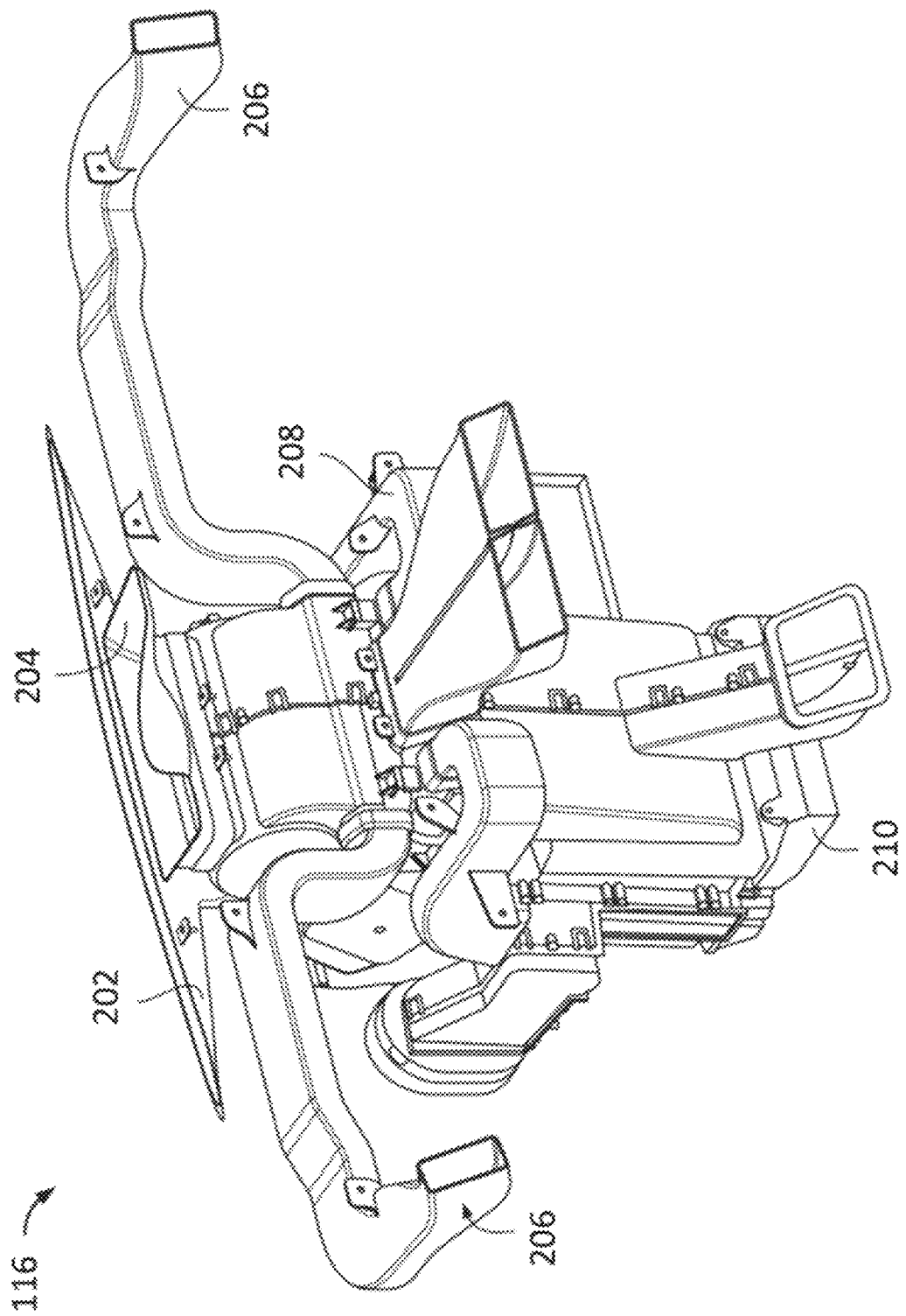
FIG. 2 shows an illustrative HVAC system of a vehicle, in accordance with some embodiments of the present disclosure.

FIG. 2 shows an illustrative HVAC system 116 of a vehicle, in accordance with some embodiments of the present disclosure. In some embodiments, HVAC system 116 may include assembly 210 for driving air to one or more ducts (e.g., by operation of a compressor, a pump, a fan, or a vacuum, or any other suitable component, or any combination thereof). In some embodiments, HVAC system 116 may comprise several different vent ducts 202-208 for respective air vents 120. In some embodiments, HVAC system 116 may include face ducts 206, foot ducts 208, ambient air duct 204, and windshield defrost duct 202. In some embodiments, processing circuitry 102 of vehicle 101, and/or air vent controller 118, may control airflow from each of the ducts 202-208 using a respective valve for each duct 202-208. For example, processing circuitry 102 of vehicle 101, and/or air vent controller 118, may cause a valve to be completely closed to stop all air flow, or partially open or close a valve to control the rate of the airflow. In some embodiments, processing circuitry 102 of vehicle 101, and/or air vent controller 118, may control airflow from each of the ducts using a respective blower motor or fan for each duct. It should be appreciated that FIG. 2 is illustrative and that additional ducts may be be included at any suitable portion of vehicle 101, e.g., a duct connected to a seat and/or a duct connected to a storage compartment, etc.

Figure 3:
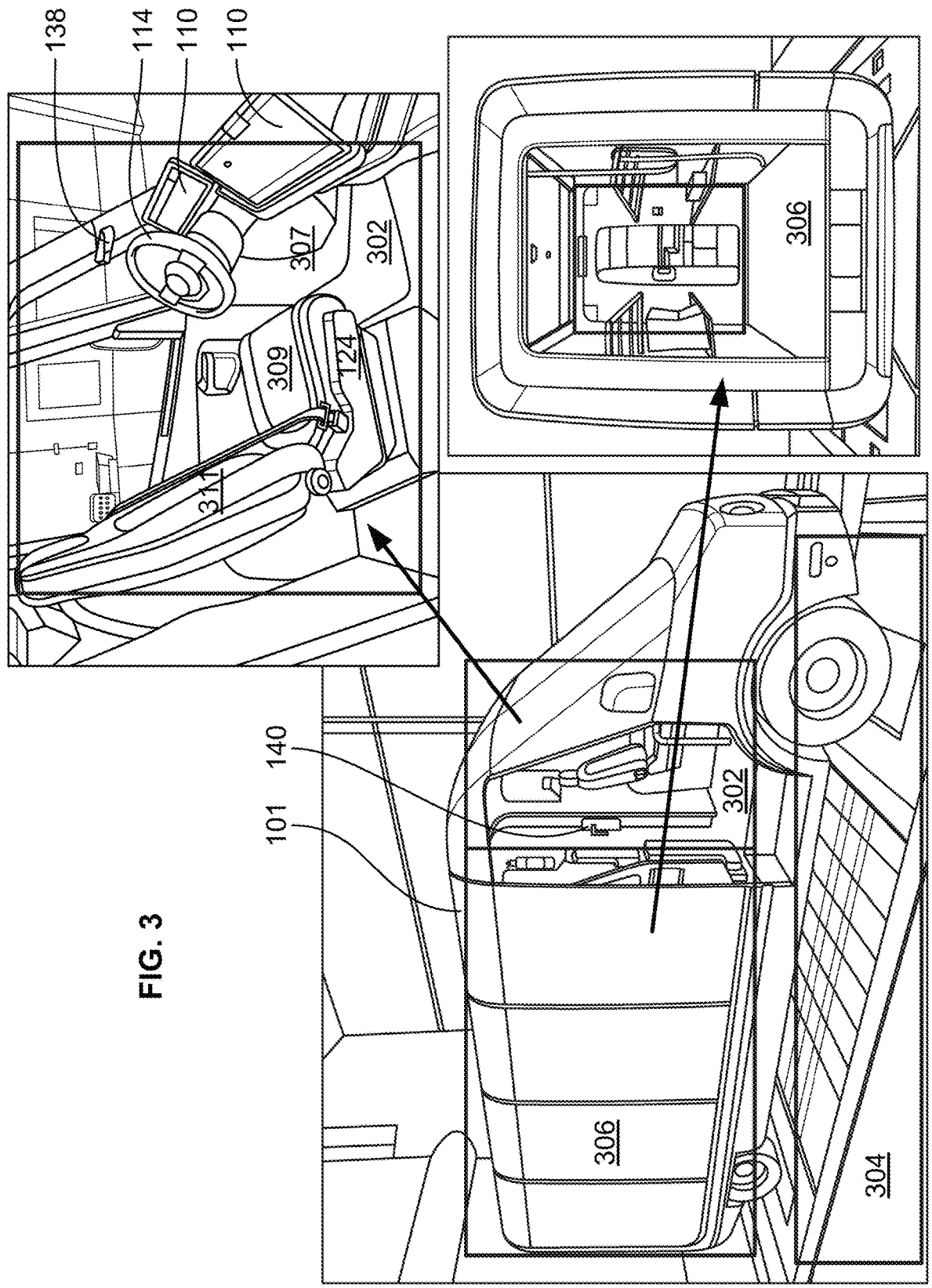
FIG. 3 shows illustrative zones of a vehicle, in accordance with some embodiments of the present disclosure.

FIG. 3 shows illustrative zones of a vehicle, in accordance with some embodiments of the present disclosure. As shown in FIG. 3, vehicle 101 may be a delivery vehicle comprising driver or operator zone or vehicle cabin 302 and cargo or loading zone 306. Vehicle cabin 302 may comprise ventilated seat 124 at which the vehicle occupant may sit and operate vehicle 101, input interface 114 (e.g., a steering wheel) and display 110, which may present information (e.g., HVAC settings, whether a drying mode is activated, an option to activate a drying mode, etc.) to the operator and receive commands from the operator. In some embodiments, vehicle cabin 302 may comprise HVAC components to provide conditioned and/or ventilated air to vehicle occupants, e.g., in accordance with the drying mode, to various portions of vehicle cabin 302, such as, for example, a region 307 corresponding to a floor or floor mat of ventilated seat 124, a seat back 311 and/or seat cushion 309 of ventilated seat 124, or any other suitable region of vehicle 101, or any combination thereof. In some embodiments, vehicle cabin 302 may comprise a camera, e.g., sensor 132, and any other suitable sensors (e.g., pressure sensor 134, seat belt sensor 136, door sensor 140, etc.), or any combination thereof. Sensor 132 may be configured to monitor actions of the user and a location of the user.

Cargo zone or loading zone 306 may correspond to a portion of vehicle 101 at which packages or products to be delivered are stored, e.g., a primary loading zone behind the cargo door or bulkhead (e.g., controlled via a motor). In some embodiments, cargo zone 306 may comprise HVAC components to provide conditioned and/or ventilated air to vehicle occupants. In some embodiments, cargo zone 306 may comprise sensor 132, and any other suitable sensors (e.g., door sensor 140 on a bulkhead door) to determine whether a vehicle occupant is present in cargo zone 306. For example, if a bulkhead door separating vehicle cabin 302 from cargo zone 306 is open, processing circuitry 102 may determine that the vehicle occupant's location is in cargo zone 306, e.g., to sort through packages to be delivered during his or her delivery shift. In some embodiments, vehicle 101 includes a selectable option (e.g., a hazard button or hazard switch) which upon being selected may cause the bulkhead door to be opened and/or which may indicate a delivery is occurring at environment 304 outside of vehicle 101. In some embodiments, when the operator leaves the vehicle (e.g., detected based on a signal received from user device 154), the cargo door may close and lock, indicating the operator has left vehicle 101. In some embodiments, the user may request a drying mode to be activated while he or she is present or planning to navigate to cargo zone 306, e.g., to sort through packages, to provide the drying mode while he or she is absent and/or when he or she returns to vehicle cabin 302. For example, the drying mode may be automatically activated in response to determining the user is outside vehicle 101 in environment 304 and/or is about to return to vehicle 101 from environment 304 (e.g., upon determining environment 304 has inclement weather likely to cause the user's clothing to become wet, and/or if a camera detects a user stepped in a puddle while in environment 304, or any other suitable factor, or any combination thereof) or cargo zone 306.

Figure 4:
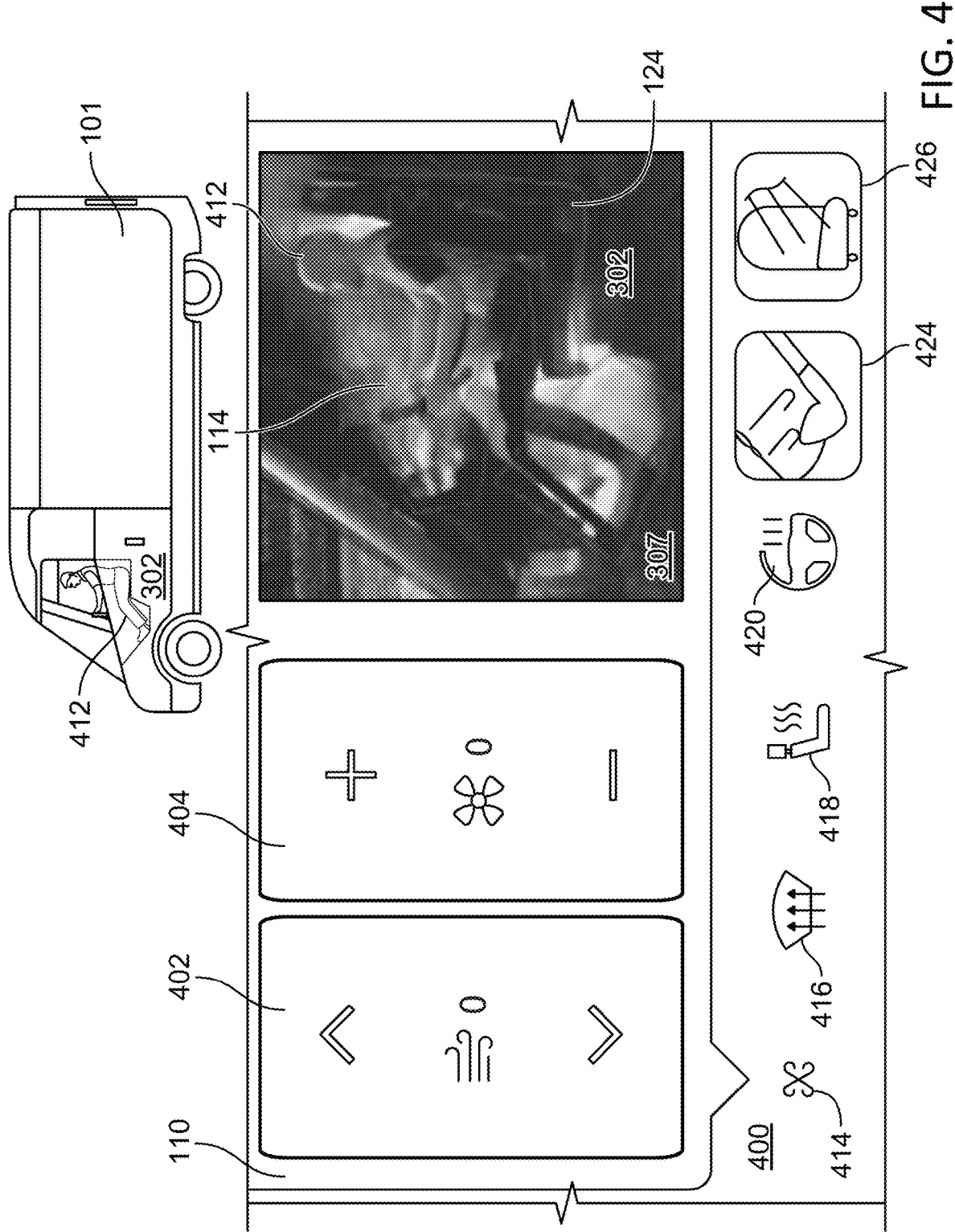
FIG. 4 shows an illustrative system for causing an HVAC system of a vehicle to activate a drying mode, in accordance with some embodiments of the present disclosure.
Figure 5A:
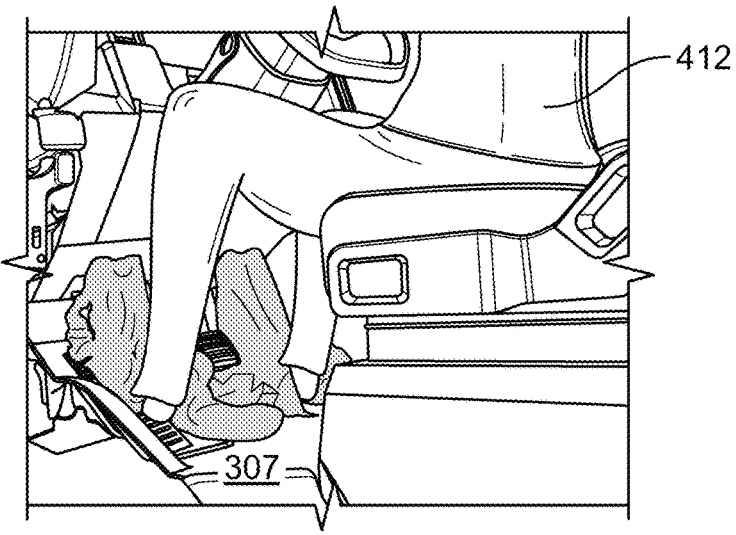
FIGS. 5A-C and 6 show illustrative thermal images of a drying mode in operation, in accordance with some embodiments of the present disclosure.
Figure 5B:
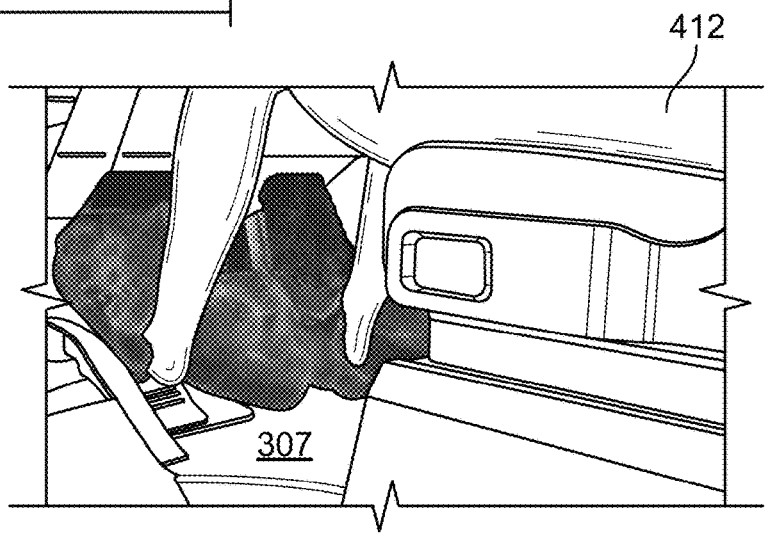
Figure 5C:
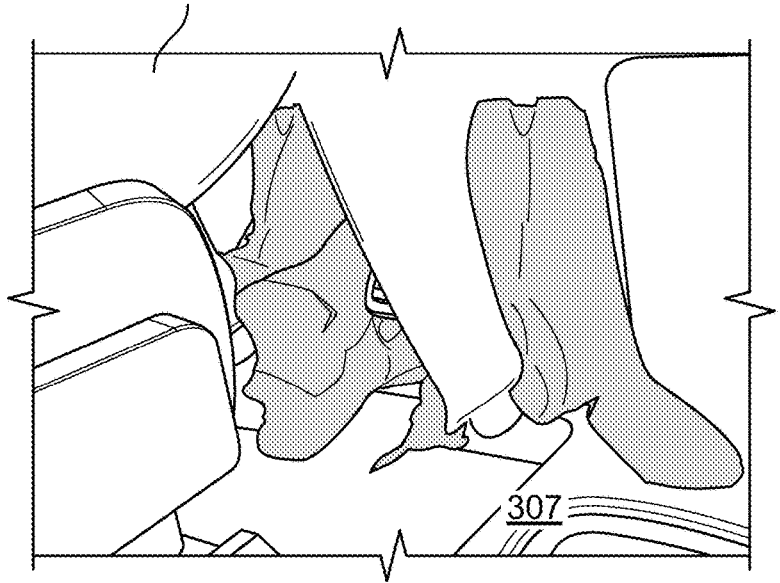

FIG. 4 shows an illustrative system for causing an HVAC system of a vehicle to activate a drying mode, in accordance with some embodiments of the present disclosure. Vehicle 101 may be a commercial delivery vehicle comprising vehicle cabin 302 and cargo or loading zone 306, at which packages to be delivered may be stored, or vehicle may be a consumer vehicle, or any other suitable vehicle. Vehicle cabin 302 may comprise ventilated seat 124 at which vehicle occupant 412 may sit and operate vehicle 101, input interface 114 (e.g., a steering wheel) and display 110, which may present information (e.g., HVAC settings, such as, for example, current HVAC settings, and/or one or more options to enter a drying mode and/or an indication of whether drying mode is activated) to occupant 412, and may be configured to receive commands from occupant 412 or any other occupant of vehicle 101. In some embodiments, vehicle cabin 302 may comprise HVAC components configured to provide conditioned and/or ventilated air to vehicle occupants, or any other suitable components to heat or cool vehicle occupant 412 (and/or other clothing, blankets, hats, towels, or other items or objects or another occupant or an animal) and/or dehumidify air in vehicle 101, or any combination thereof.

As shown in FIG. 4, processing circuitry 102 may cause display 110 to provide interface 400 which may comprise any suitable number or type of options to control HVAC system 116 and/or activate a drying mode, selectable when occupant 412 is in vehicle cabin 302, and/or remotely (e.g., via user device 154). Interface 400 may comprise selectable options 402 and 404, associated with icon 414, to set parameters (e.g., flow rate and/or temperature of air provided via air vents) of HVAC settings in vehicle 101. In some embodiments, such options (and associated air vents or other HVAC components) may be provided for each portion of vehicle cabin 302, e.g., a portion that provides heating, cooling, ventilation and/or conditioning at a face of the user, a chest or torso of the user, lower body of the user, feet of the user, a back or rear of the user, or any other suitable portion of vehicle cabin 302, or any combination thereof. Icon 416 may correspond to a defrost operation, icon 418 may correspond to an option to activate heating or cooling of ventilated seat 124, and option 420 may correspond an option to activate heating or cooling of input interface 114 (e.g., a steering wheel of vehicle 101). Such options may permit a user to select heating and/or cooling settings, airflow settings, and mode of operation (face, foot, seat, or any other suitable portion, or any combination thereof).

Interface 400 may comprise selectable one or more options, e.g., options 424 and 426, corresponding to the drying mode. For example, option 424 may correspond to a foot drying mode intended to quickly dry the feet of occupant 412 and/or articles of clothing (e.g., socks, shoes, sandals, boots, or any other suitable clothing or any combination thereof) being worn on the feet of occupant 412. Option 426 may correspond to a body drying mode intended to quickly dry the torso, back and/or upper body of occupant 412 and/or articles of clothing (e.g., shirts, jackets, sweaters, or any other suitable clothing or any combination thereof) being worn on the torso, back and/or upper body of occupant 412. In some embodiments, additional or alternative options may be presented corresponding to a drying mode for other body parts and/or articles of clothing of occupant 412 or any other suitable option for drying other materials (e.g., towels or blankets, even if not being worn by an occupant) or drying other occupants (e.g., a child or a pet). In some embodiments, when the drying mode is activated, HVAC system 116 can control and modify setpoints for an airflow mode (where airflow goes), an airflow rate, an airflow temperature, and the amount of air dehumidification applied, and any other suitable HVAC system parameters, or any combination thereof. In some embodiments, the setpoints of such parameters may vary depending on ambient conditions outside vehicle 101 and/or whether occupant 412 is determined to be present in vehicle 101 or a particular portion of vehicle 101.

In some embodiments, in response to receiving selection of option 424 which may correspond to the drying mode (e.g., a foot drying mode), HVAC system 116 may be automatically adjusted and calibrated to the designated drying mode to direct thermal energy towards a region 307 of vehicle 101, e.g., in front of seat 124 and below a top of a seat cushion 309 of seat 124. Such foot drying mode nay be configured to direct thermal energy to run a suitable level of airflow and heating to maximize foot drying, to a floor near a driver's seat or a floor near a passenger's seat. For example, processing circuitry 102 may retrieve, and/or cause HVAC system 116 to retrieve, one or more HVAC system parameters optimum for the drying mode associated with option 424. For example, HVAC system 116 may retrieve parameters indicating that HVAC system 116 should run in full on the user's feet, e.g., indicating air vents at region 307 should be configured to blow air at a maximum temperature at a maximum flow rate, or any other relatively high temperature and flow rate or any other relatively high temperature and flow rate suitable to rapidly heat and/or dry the user's body, and/or other air vents at other portions of vehicle 101 may be automatically redirected to blow air towards region 307 based on the same or similar HVAC parameters. Any suitable number of dedicated foot outlets (e.g., 2 per foot or any other suitable number) may be used to blast occupants' feet with warm, dry air, or any other suitable type of air. In some embodiments, in combination with the parameters for the air flow rate and/or temperature, a suitable humidity level may be selected and a dehumidification process may be applied in accordance with a humidity setpoint of the drying mode. In some embodiments, the drying mode may be entered automatically, e.g., based on current weather conditions and/or ambient temperature, and option 424 may be illuminated or otherwise indicate to the user that the drying mode has been entered, even without explicit selection of option 424 by the user.

In some embodiments, parameters for the drying mode (e.g., associated with the lower body clothing or socks/shoes) may depend on an ambient conditions, e.g., ambient temperature (e.g., measured by sensor 137 or via another device, e.g., user device 154 or server 156, or any other suitable device or combination of devices). For example, higher temperatures of air and/or higher flow rates of air and/or more thermal energy may be provided when the ambient temperature is relatively cold as opposed to when the ambient temperature is relatively warm. Alternatively, in some circumstances, if ambient temperatures are particularly high, lower temperatures and/or higher flow rates and/or more thermal energy may be used to dry a user's potentially sweaty clothing and/or other materials or other users, e.g., upon returning to vehicle 101, such as, for example, during a hot summer day. Additionally or alternatively, HVAC system 116 may determine, based on a sensor reading from humidity sensor 139, whether to dehumidify the air, e.g., if the humidity level in an interior of vehicle 101 exceeds a particular threshold stored in memory (e.g., 50% relative humidity or any other suitable value), HVAC system 116 may, e.g., run the air conditioning system to reduce humidity in the air to an acceptable level (e.g., 40% relative humidity or any other suitable value). A setpoint for the humidity level of the air in the interior of the vehicle for the drying mode may be selected to optimize drying of materials and/or occupants located at a particular portion of vehicle 101. In some embodiments, a humidity threshold may vary based on ambient temperature conditions, e.g., a lower threshold may be used for lower ambient temperatures, and a higher threshold may be used in higher ambient temperatures. Such features may enable feet and associated clothing of occupant 412 to be quickly dried to improve the driving experience and comfort of occupant 412.

In some embodiments, in response to receiving selection of option 426 which may correspond to the drying mode (e.g., a body drying mode), HVAC system 116 may be automatically adjusted and calibrated to the designated drying mode associated with the user's upper body, e.g., a seat drying mode, to utilize seat 124 and/or air vent 120 to supply a suitable level of airflow and heating to maximize body drying through the contact and local areas around the seat. For example, processing circuitry 102 may retrieve and/or cause HVAC system 116 to retrieve one or more HVAC system parameters optimum for the drying mode associated with option 426. HVAC system 116 may retrieve parameters indicating that HVAC system 116 should run in full on the user's upper body, e.g., air vents near a steering wheel of vehicle 101, an example of input interface 114, or otherwise near the upper body of occupant 412 may be configured to blow air at a maximum temperature at a maximum flow rate, or any other relatively high temperature and flow rate suitable to rapidly heat and/or dry the user's body, and/or other air vents at other portions of vehicle 101 may be automatically redirected to blow air towards the upper body clothing of occupant 412 based on the same or similar HVAC parameters. Additionally or alternatively, as part of the body drying mode corresponding to the clothing of the user's upper body, ventilated seat 124 may provide thermal energy at a maximum temperature (e.g., to heat or cool the user's body), or at a relatively higher level than previously being provided, at one or more of seat back cushion 311 and a bottom cushion 309 of seat 124. In some embodiments, ventilated seat 124 may be directly connected to the vehicles main HVAC, which may enable the ability to flow heated and/or cooled airflow at very high rates through both the bottom and back cushions. This may enable thermal energy provided to and stored by the seat to be transmitted to the seat mass, to enable the seat 124 to transmit the stored energy to the body of occupant 412 over a large surface area, e.g., via conduction, which may rejuvenate occupant 412 by quickly heating and/or drying (or cooling and/or drying) clothing and/or body parts of occupant, who may be drenched or very wet due to any of a multitude of environment conditions or other circumstances. Such thermal energy provided via the seat may vary based on ambient conditions, e.g., thermal energy at a lower temperature may be provided when the ambient temperature is high such as during the summer, and thermal energy at a higher temperature may be provided when the ambient temperature is low such as during the winter. In some embodiments, occupant 412 may activate the seat drying mode when seat 124 is wet and when occupant 412 is leaving or is outside vehicle 101, to enable seat 124 to be rapidly dried while occupant 412 is outside vehicle 101 and/or the drying mode may be automatically activated based on water sensor 143 indicating that seat 124 is wet. In some embodiments, in combination with the parameters for the air flow rate and temperature, a suitable humidity level may be selected and a dehumidification process may be applied in accordance with a setpoint of the drying mode. In some embodiments, the drying mode may be entered automatically, e.g., based on current weather conditions and/or ambient temperature, and option 426 may be illuminated or otherwise indicate to the user that the drying mode has been entered, even without explicit selection of option 426 by the user.

In some embodiments, parameters for the drying mode (e.g., associated with the upper body) may depend on an ambient temperature (e.g., measured by sensor 137 or via another device, e.g., user device 154 or server 156, or any other suitable device or combination of devices). For example, higher temperatures of air and/or higher flow rates of air and/or more thermal energy may be provided when the ambient temperature is relatively cold as opposed to when the ambient temperature is relatively warm. Alternatively, in some circumstances, if ambient temperatures are particularly high, lower temperatures and/or higher flow rates and/or more thermal energy may be used to dry a user's potentially sweaty clothing, e.g., upon returning to vehicle 101, such as, for example, during a hot summer day. In some embodiments, if HVAC system 116 determines, based on a sensor reading from humidity sensor 139, whether to dehumidify the air, e.g., if the humidity level in an interior of vehicle 101 exceeds a particular threshold stored in memory (e.g., 50% relative humidity or any other suitable value), HVAC system 116 may, e.g., run the air conditioning system to an acceptable level (e.g., 40% relative humidity or any other suitable value). In some embodiments, a humidity threshold may vary based on ambient temperature conditions, e.g., a lower threshold may be used for lower ambient temperatures, and a higher threshold may be used in higher ambient temperatures. Such features may enable a torso and/or back and/or upper body and associated clothing of occupant 412 to be quickly dried to improve the driving experience and comfort of occupant 412.

In some embodiments, the drying modes may be associated with a time out feature. For example, the drying mode may be configured to run for a predetermined period of time (e.g., 5 minutes, 10 minutes or any other suitable period of time) prior to being turned off and reverting to the prior HVAC settings. In some embodiments, the time out period may be set to different periods of time based on ambient conditions and/or humidity or any other suitable parameter, or any combination thereof. For example, if the ambient temperature is particularly low and/or humidity levels are particularly high, it may be desirable for the time out feature to be suspended or extended to a longer time out period than under usual conditions. In some embodiments, the time out feature may be capable of being overridden by the user via one or more selectable options. In some embodiments, a timer associated with the timeout feature may not be activated unless processing circuitry 102 determines that occupant 412 is present in seat 124, e.g., based on signals received from one or more sensors (e.g., pressure sensor 134, seat belt sensor 136, door sensor 140, or any other suitable sensor, or any combination thereof) to avoid the drying mode being deactivated while the user is outside vehicle 101. In some embodiments, the user may be provided the ability to elect to turn off the drying mode once his or her clothing is sufficiently dry, and revert to normal HVAC conditions. In some embodiments, one or more drying modes may be activated for any suitable number of vehicle occupants.

In some embodiments, the user may request to activate multiple drying modes, e.g., by selecting each of option 424 and 426, and/or any other suitable drying mode options, to provide the maximum possible HVAC capabilities to each region of vehicle 101. Alternatively, only one of option 424 and 426 may be activated at a time (e.g., a foot only mode in which substantially all thermal energy resources are directed towards the user's feet and/or lower body, or a seat only mode in which substantially all thermal energy resources are directed towards the user's back and/or torso and/or upper body), such as to enable dedicating the maximum HVAC system resources to a particular region of vehicle 101 associated with corresponding clothing of occupant 412. The drying mode may be activated while the user is present in the vehicle cabin (e.g., at ventilated seat 124) and/or while the user is outside the vehicle (e.g., out on a delivery). In some embodiments, the user may be permitted to alter certain settings of the drying mode, during a current drying mode session and/or for subsequent sessions.

In some embodiments, processing circuitry 102 and/or HVAC system 116 may reference a table stored in memory 106 (or memory of server 156, or any suitable memory or any combination thereof) in determining particular HVAC parameters to be used for the drying mode. For example, different drying modes may be associated with different lookup tables or different portions of a lookup table indicating different HVAC parameters for the respective drying modes. Any suitable number of factors may be taken into account in determining whether and how to adjust parameters of HVAC system 116 for the drying mode, e.g., solar irradiance on vehicle 101, ambient temperature, humidity level, blower power (e.g., how much conditioned or unconditioned air to blow), heater temperature, evaporation setpoint (e.g., how much heating or cooling should be provided), target temperature, whether a vehicle door is left open, an indication of whether HVAC should stay on, and/or any other suitable factor, or any combination thereof. For example, processing circuitry 102 may access the table stored in memory and perform a lookup based on the selected drying mode, e.g., foot drying mode associated with a user's socks and/or shoes; body drying mode associated with a user's upper body and/or torso and/or back; a drying mode associated with a particular type of material or a drying mode associated with a particular age group of a person or a drying mode associated with a pet or particular type of pet, and/or any other suitable drying mode or any combination thereof. For example, the lookup table may indicate that the foot drying mode does not utilize ventilated seats, whereas the body drying mode may utilize ventilated seats, and/or may indicate any other suitable parameters of HVAC system 116 for use in the drying mode, or any combination thereof.

Figure 6:
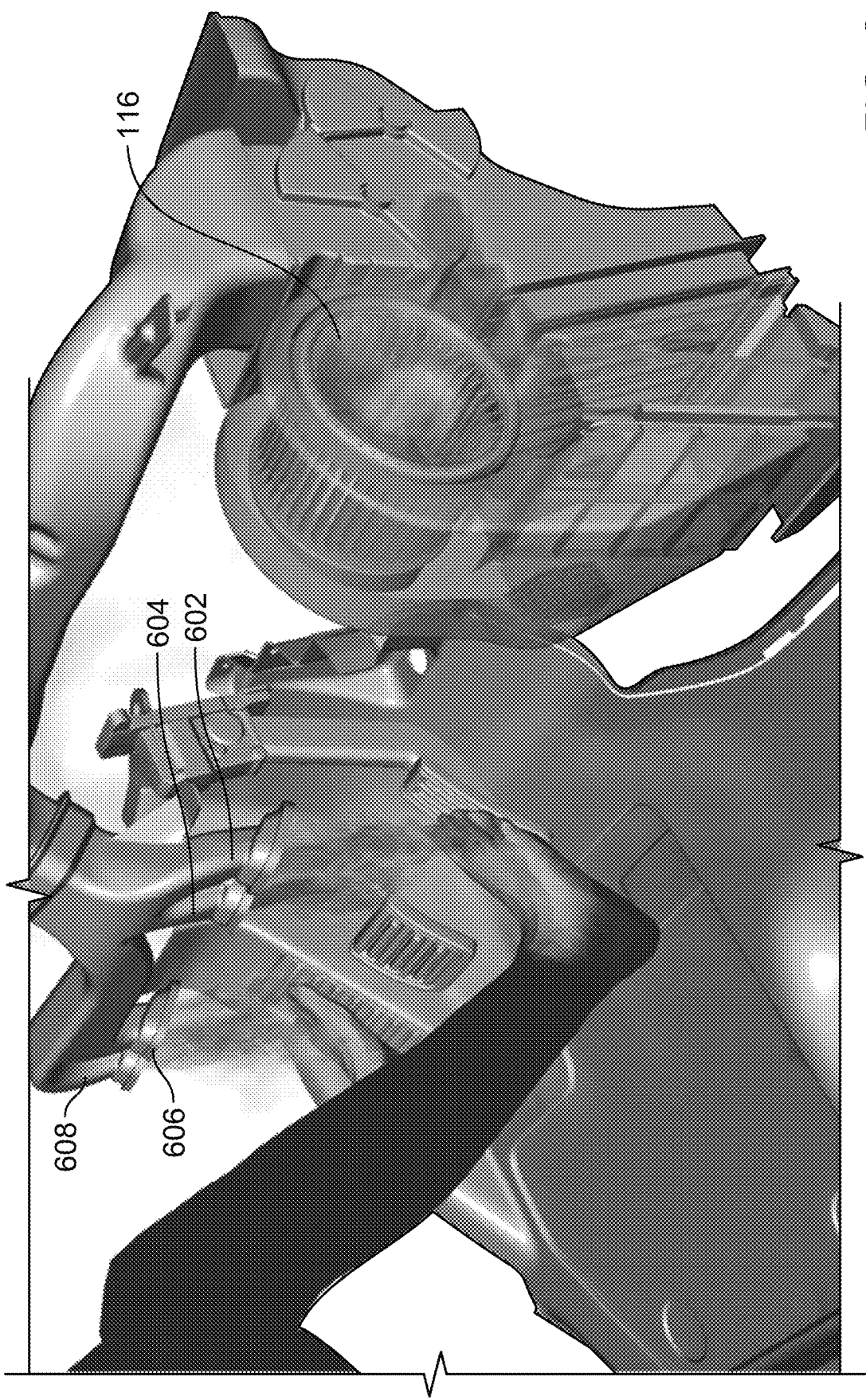

FIGS. 5A-C and 6 show illustrative thermal images of a drying mode in operation, in accordance with some embodiments of the present disclosure. When the feet drying mode activated, thermal energy may be directed towards region 307 of vehicle 101. For example, both feet of the user may be covered by the airflow. In some embodiments, the user may be permitted to select an option to instruct HVAC system 116 to concentrate maximum thermal energy on a particular foot, e.g., if only one of the occupant's feet is wet. The airflow may be provided at any suitable velocity or flow rate, suitable to rapidly dry the feet of occupant 412. As shown in FIG. 6, HVAC system 116 may comprise or otherwise be in communication with dedicated foot outlets 602 and 604, which may be configured to direct thermal energy to one of the user's feet in the drying mode, and dedicated foot outlets 606 and 608, which may be configured to direct thermal energy to one of the occupant's feet in the drying mode. Any suitable number of foot outlets may be employed for each foot. While occupant 412 is shown with no socks or shoes in FIG. 6, such that occupant's bare feet may be directly exposed to thermal energy during the drying mode, in some embodiments, shoes and/or socks of occupant 412 may be worn by occupant and exposed to thermal energy via outlets 602, 604, 606, 608.

Figure 7:
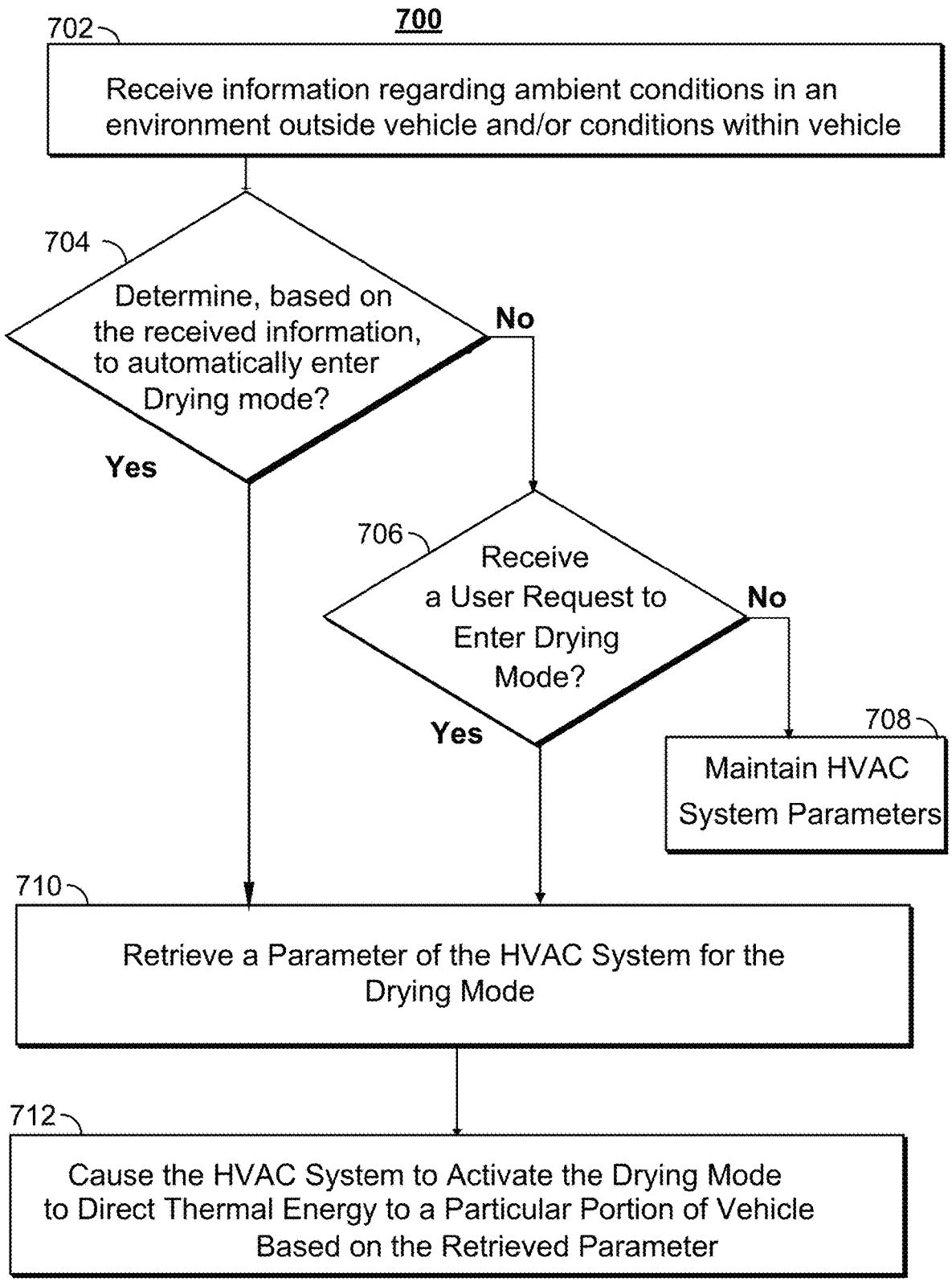
FIG. 7 shows a flowchart of an illustrative process for causing an HVAC system of a vehicle to activate a drying mode, in accordance with some embodiments of the present disclosure.

FIG. 7 shows a flowchart of an illustrative process for causing an HVAC system of a vehicle to activate a drying mode, in accordance with some embodiments of the present disclosure. Process 700 may be executed at least in part by processing circuitry 102 of vehicle 101, and/or circuitry of HVAC system 116, or any other suitable circuitry, or any combination thereof.

At 702, processing circuitry 102 and/or HVAC system 116 of vehicle 101 may receive information regarding ambient conditions in an environment 304 outside vehicle 101 and/or regarding conditions within vehicle 101. For example, processing circuitry 102 may receive a sensor signal from ambient temperature sensor 137 indicating a particular ambient temperature outside vehicle 101 and/or may receive a sensor signal from humidity sensor 139 indicating a current humidity level within (and/or outside) vehicle 101. Additionally or alternatively, processing circuitry 102 may receive a signal from water sensor 143, which may be positioned at or around seat 124 and/or another portion of vehicle 101, indicating that seat 124 is wet and/or indicating that such other portion of vehicle 101 is wet, and/or processing circuitry 102 may receive a signal from precipitation sensor 141 indicating that it is currently raining, snowing, etc. in the environment 304 outside vehicle 101.

At 704, processing circuitry 102 may determine, based on the information received at 702, whether to automatically enter a drying mode. For example, HVAC system 116 may determine to automatically enter the drying mode upon determining that it is currently raining or otherwise precipitating outside vehicle 101 and/or upon determining that seat 124 or other portions of vehicle 101 are wet. In some embodiments, processing circuitry 102 may determine was exposed to the precipitation. For example, processing circuitry 102 may determine, e.g., based on sensor signals received from pressure sensor 134 and/or door sensor 140 and/or any other suitable sensor, whether occupant 412 of vehicle 101 is inside or outside vehicle 101 during a period of precipitation and has since returned, or whether occupant 412 is currently outside of vehicle 101 during the period of precipitation, either of which may impact whether to enter the drying mode. For example, if sensors signals from water sensor 143 indicates seat 124 or another vehicle component is wet, it may be preferable to dry seat 124 while occupant 412 is outside vehicle 101, e.g., delivering a package. As another example, it may be preferable to dry seat 124 once occupant 412 returns to vehicle 101, e.g., to dry clothing of occupant 412. Processing may proceed to 710 upon determining to automatically enter the drying mode; otherwise processing may proceed to 706.

At 706, I/O circuitry 108 may determine whether a user request to enter a drying mode has been received. Such request may be received in any suitable form, e.g., via user selection of an icon on a touchscreen display 110 on vehicle 101 (e.g., option 424 and/or option 426 of FIG. 4), via selection of a button or switch at a dashboard of vehicle 101, via voice command received by a microphone of vehicle 101, via tactile input, via user device 154, or via any other suitable input, or any combination thereof. In some embodiments, an instruction may be received via I/O circuitry 108 to activate the drying mode each time a user returns to vehicle 101 on a particular day, e.g., if it is raining or snowing all day. Alternatively, as discussed above, in at least some circumstances, processing circuitry 102 may cause HVAC system 116 to automatically enter the drying mode, based on one or more factors, e.g., current weather conditions, ambient temperature, humidity level, or any other suitable factor, or any combination thereof. In some embodiments, the user request may be received while occupant 412 is inside vehicle 101 or is located outside vehicle 101.

At 710, processing circuitry 102 and/or HVAC system 116, having received the user request to enter the drying mode or otherwise having determined to automatically enter the drying mode, may retrieve one or more parameters of HVAC system 116 for the drying mode. In some embodiments, the retrieved parameters may depend on which drying mode is associated with the user request or automatic determination. For example, the drying mode corresponding to, e.g., a sock and/or shoe drying mode or foot drying mode, and/or a drying mode in which thermal energy is provided to a region of vehicle 101 in front of seat 124 and in a vicinity of the seat floor, may be entered if option 424 is selected or may be entered automatically upon determining that such portion of vehicle 101 is wet and/or that the user or the user's clothing or other material positioned at such portion of vehicle 101 is wet and/or based on current ambient temperature and/or a current precipitation status of the environment 304 surrounding vehicle 101 and/or based on any other suitable factor. In such instance, processing circuitry 102 and/or HVAC system 116 may retrieve parameters corresponding to one or more of a temperature setpoint (e.g., a maximum heating or cooling temperature, or other relatively high temperature or relatively low temperature, depending on the determined ambient conditions), a humidity setpoint, a blower setpoint, a flow rate of air vents setpoint (e.g., a flow rate or other relatively high flow rate), a direction of air flow setpoint (e.g., directed towards region 307) and/or any other suitable parameter may be retrieved, or any combination thereof.

On the other hand, the drying mode corresponding to, e.g., a shirt and/or jacket drying mode or body drying mode, and/or a drying mode in which thermal energy is provided to a region of vehicle 101 at or around seat 124 and/or in a vicinity of a steering wheel of vehicle 101, an example of input interface 114, may be entered if option 426 is selected or may be entered automatically upon determining that such portion of vehicle 101 is wet and/or that the user or the user's clothing or other material positioned at such portion of vehicle 101 is wet and/or based on current ambient temperature and/or a current precipitation status of the environment 304 surrounding vehicle 101 and/or based on any other suitable factor. In such instance, processing circuitry 102 and/or HVAC system 116 may retrieve parameters corresponding to one or more of a temperature setpoint (e.g., a maximum heating or cooling temperature, or other relatively high temperature or other relatively low temperature, depending on the determined ambient conditions), a ventilated seat setpoint (e.g., a maximum level of thermal energy directed to seat and/or temperature thereof) humidity setpoint, a blower setpoint, a flow rate of air vents setpoint (e.g., a maximum flow rate or other relatively high flow rate), a direction of air flow (e.g., directed towards a portion of vehicle cabin 302, such as seat 124, at which a torso and/or chest and/or back and/or upper body, and jacket and/or shirt is present), or any other suitable parameter may be retrieved, or any combination thereof. While drying modes associated with options 424 and 426 (or automatic entry of such dry modes without explicit selection of option 424 or 426) are described, it should be appreciated that any other suitable drying modes, or any combination thereof, may be provided by HVAC system 116 of vehicle 101.

Processing may proceed to 706 from 708, if no user request to enter a drying mode is received by I/O circuitry 108 of vehicle, and/or if processing circuitry 102 or HVAC system 116 does not determine to automatically enter the drying mode. At 708, the current HVAC system parameters may be maintained.

At 712, processing circuitry 102 may cause HVAC system 116 to activate the drying mode to direct thermal energy a particular portion of vehicle 101 based on the retrieved parameter. For example, as discussed in connection with 710, processing circuitry 102 may adjust or modify current parameters (e.g., one or more current setpoints of temperature, humidity, flow rate and/or any other suitable setpoint) of HVAC system 116 to apply the retrieved parameters for one or more of the drying modes, such as, for example, a temperature setpoint, a ventilated seat or other ventilated portion of vehicle 101 setpoint, a humidity setpoint, a blower setpoint, a flow rate of air vents 120 setpoint, a direction of air flow and/or any other suitable setpoint or parameter, where one or more of such setpoints may be based on ambient conditions outside vehicle 101 and/or conditions within vehicle 101. In some embodiments, processing circuitry 102 may be configured to cause the HVAC system to activate the drying mode to direct thermal energy by using seat 124 (and/or any other suitable vehicle component) the vehicle 101 to direct the thermal energy, e.g., to a body of occupant 412.

In some embodiments, the drying mode may function as a feet drying mode to direct thermal energy to dry shoes and socks of a user, or a body drying mode to direct thermal energy to dry a shirt and/or jacket of the user, which may be employed to rapidly dry the associated clothing and/or body parts wearing the clothing of occupant 412 and/or any other suitable occupants of vehicle 101. In some embodiments, the drying mode may be configured to dry materials (e.g., of a hat, a towel, a blanket and/or any other suitable material, a pet, other occupants and/or any other suitable item or entity). In some embodiments, a timeout feature may be employed, such that the drying mode remains activated for a predetermined period of time (e.g., 5 minutes or 10 minutes or any other suitable period of time) prior to reverting to normal or the previous HVAC settings. Such predetermined period of time may be set by the user or by HVAC system 116, e.g., based on current ambient conditions within and/or outside vehicle 101 and/or a level of wetness of a particular portion of vehicle 101, e.g., seat 124. For example, if seat 124 is determined, based on sensor signals from water sensor 143, to be a wetness above a particular threshold or for an amount of water above a particular threshold to be present, the predetermined period of time may be longer than if the wetness or amount of water is less than the threshold.

In some embodiments, the drying mode may be employed to dry vehicle components (e.g., seat 124, a steering wheel of vehicle 101, an example of input interface 114, or any other suitable component or any combination thereof) while a user is inside or outside vehicle 101. For example, if a vehicle seat is wet, the user may select, or processing circuitry 102 may automatically determine, to activate a seat drying mode (e.g., utilizing similar parameters to the body drying mode or shirt or jacket drying mode) to dry the seat while the user is outside vehicle 101 and/or when the user returns to vehicle 101. In some embodiments, one or more drying modes may be automatically activated, e.g., based on readings of humidity sensor 139 or readings of a water sensor 143 that may detect the presence of water, or any other suitable sensor or any combination thereof, outputs a signal to processing circuitry 102 and/or HVAC system 116 indicating that a particular vehicle component is significantly wet, e.g., a measurement above a threshold value is received from the sensor.

Figure 8:
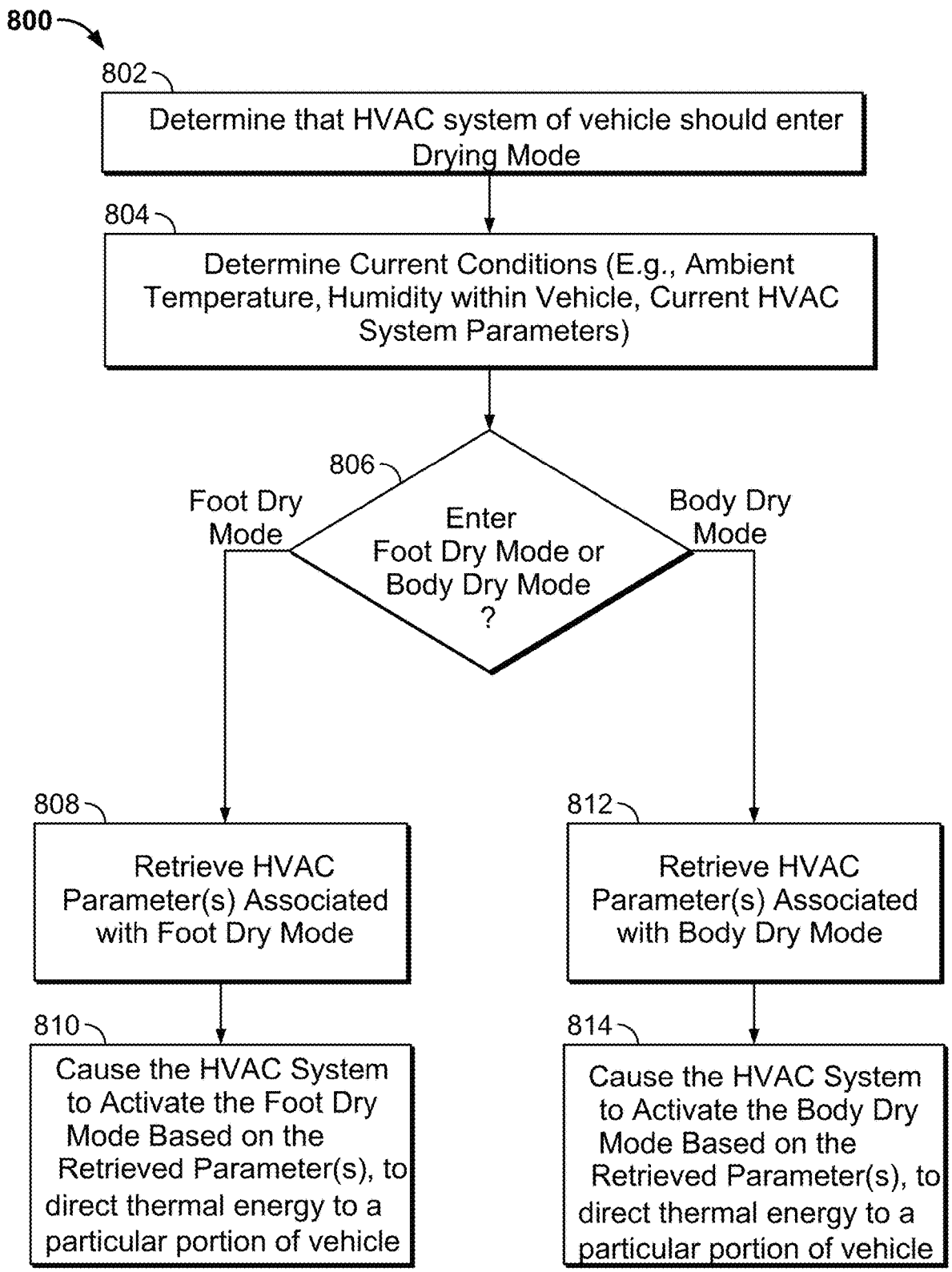
FIG. 8 shows a flowchart of an illustrative process for causing an HVAC system of a vehicle to activate a drying mode, in accordance with some embodiments of the present disclosure.

FIG. 8 shows a flowchart of an illustrative process for causing an HVAC system of a vehicle to activate a drying mode, in accordance with some embodiments of the present disclosure. Process 800 may be executed at least in part by processing circuitry 102 of vehicle 101, and/or circuitry of HVAC system 116, or any other suitable circuitry, or any combination thereof.

At 802, processing circuitry 102 and/or HVAC system 116 may determine whether HVAC system 116 should enter the drying mode. For example, any suitable combination of steps 702 to 708 of FIG. 7 may be performed to determine whether the drying mode should be automatically entered or whether a user request to enter a drying mode has been received. At 804, processing circuitry 102 and/or HVAC system 116 may determine current conditions in vehicle 101 and external to vehicle 101. For example, processing circuitry 102 and/or HVAC system 116 may determine an ambient temperature in a location corresponding to the location of vehicle 101, humidity level within vehicle based on output signals from sensor 139, current HVAC system 116 parameters such as, for example, current air flow rate and temperature, current ventilated seat 124 settings, whether portions of an interior of vehicle is wet, whether precipitation is currently falling outside vehicle 101, or any other suitable current conditions or any combination thereof. In some embodiments, such current conditions may be determined as part of 802, when determining whether to automatically enter the drying mode. In some embodiments, processing circuitry 102 may determine whether occupant 412 is currently present in vehicle cabin 302 of vehicle 101, e.g., based on signals received from pressure sensor 134 or any other suitable sensor. In some embodiments, the determined current conditions in and around vehicle 101 may impact the one or more retrieved parameters of 808, 812.

At 806, processing circuitry 102 and/or HVAC system 116 may determine whether the user request received, or determination to automatically enter the drying mode, at 802, corresponds to a foot drying mode or a body drying mode (or any other suitable drying mode). For example, the foot drying mode may correspond to a drying mode that is configured to direct thermal energy to rapidly dry feet and clothing (e.g., shoes, socks) being worn on the feet of occupant 412, and the body drying mode may correspond to a drying mode that is configured to rapidly dry an upper body and/or chest region and/or back of occupant 412, and/or a jacket or shirt or other clothing being worn at such portions of the body of occupant 412. In some embodiments, option 424 may correspond to the foot drying mode whereas option 426 may correspond to the body drying mode. In some embodiments, one or mode of such modes may be automatically entered based on a determined wetness of particular portions of vehicle 101 and/or other determined conditions within or outside vehicle 101.

At 808, processing circuitry 102 and/or HVAC system 116 may retrieve HVAC parameters associated with the foot drying mode. For example, if option 424 corresponding to a sock and/or shoe drying mode or foot drying mode is selected (or otherwise such drying mode is otherwise determined to be automatically entered), processing circuitry 102 and/or HVAC system 116 may retrieve parameters corresponding to one or more of a temperature setpoint (e.g., a maximum heating or cooling temperature, or other relatively high temperature or relatively low temperature, depending on the determined ambient conditions), a humidity setpoint, a blower setpoint, a flow rate of air vents 120 setpoint (e.g., a flow rate or other relatively high flow rate), a direction of air flow (e.g., directed towards region 307). In some embodiments, the determined current conditions in and around vehicle 101 may impact the one or more retrieved parameters of 808, 812. For example, if ambient temperatures are particularly low, a particularly high temperature setpoint for air provided by the air vents 120 of HVAC system 116 and directed to the user's feet may be employed. As another example, if the current conditions indicate an excessive amount of humidity, a dehumidification process may be performed by HVAC system 116 to reduce the humidity level in vehicle 101, e.g., alone or in combination with adjusting the temperature setpoint and/or a flow rate setpoint and/or adjusting current HVAC parameters to implement any other suitable setpoint.

At 810, processing circuitry 102 and/or HVAC system 116 may cause HVAC system 116 to activate the foot drying mode based on the retrieved parameter(s), to direct the thermal energy to a particular portion of vehicle 101, e.g., region 307 of vehicle 101. This may enable the user's feet and/or shoes and/or socks and/or any other suitable material or occupant or other entity, to be rapidly dried, to enhance the user's comfort while operating vehicle 101.

At 812, if option 426 corresponding to a shirt and/or jacket drying mode or body drying mode is selected (or otherwise such drying mode is otherwise determined to be automatically entered), processing circuitry 102 and/or HVAC system 116 may retrieve parameters corresponding to one or more of a temperature setpoint (e.g., a maximum heating or cooling temperature, or other relatively high temperature or relatively low temperature, depending on the determined ambient conditions), a ventilated seat setpoint (e.g., a maximum level of thermal energy directed to seat) humidity setpoint, a blower setpoint, a flow rate of air vents 120 setpoint (e.g., a maximum flow rate or other relatively high flow rate), a direction of air flow (e.g., directed towards a portion of vehicle cabin 302 at which a torso and/or back and/or upper body, and jacket and/or shirt, of occupant 412, such as seat 124 of vehicle 101), or any other suitable parameter may be retrieved, or any combination thereof. For example, if ambient temperatures are particularly low, a particularly high temperature setpoint for air provided by the air vents 120 of HVAC system 116 and directed to the user's upper body may be employed. As another example, if the current conditions indicate an excessive amount of humidity, a dehumidification process may be performed by HVAC system 116 to reduce the humidity level in vehicle 101, e.g., alone or in combination with adjusting the temperature setpoint and/or a flow rate setpoint and/or adjusting current HVAC parameters to implement any other suitable setpoint.

At 814, processing circuitry 102 and/or HVAC system 116 may cause HVAC system 116 to activate the foot drying mode to direct the thermal energy to the upper body of the user based on the retrieved one or more parameters. This may enable the user's chest, back and/or upper body and/or jacket, shirt, etc., and/or any other suitable material or occupant or other entity, to be rapidly dried, to enhance the user's comfort while operating vehicle 101.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:
1. A vehicle, comprising:
a heating, ventilation, and air conditioning (HVAC) system;
a sensor configured to detect water on a windshield of the vehicle; and
processing circuitry configured to:
 determine, based on sensor data received from the sensor, that precipitation is occurring in an environment external to the vehicle;
 in response to the determining, cause display of an option related to a drying mode;
 based on receiving selection of the option, determine to enter the drying mode;
 retrieve a parameter of the HVAC system for the drying mode; and
 cause the HVAC system to activate the drying mode to direct thermal energy to a particular portion of the vehicle based on the retrieved parameter.
2. The vehicle of claim 1, wherein;
the processing circuitry is further configured to determine, based on a received sensor input, that a seat of the vehicle is wet;
the particular portion of the vehicle comprises the seat; and
the processing circuitry is configured to cause the HVAC system to activate the drying mode to direct thermal energy by using the seat of the vehicle to direct the thermal energy.
3. The vehicle of claim 1, wherein the processing circuitry is further configured to:
determine that a user of the vehicle was exposed to the precipitation; and determine to enter the drying mode further in response to determining that the user was exposed to the precipitation.

4. The vehicle of claim 1, wherein:
the processing circuitry is further configured to determine an ambient temperature outside the vehicle;
the particular portion of the vehicle is at least one of:
a seat of the vehicle, or
a region of the vehicle that is in front of the seat and below a top of a seat cushion of the seat;
the parameter corresponds to a temperature setpoint of the thermal energy directed to the particular portion of the vehicle; and
the temperature setpoint of the thermal energy directed to the particular portion of the vehicle during the drying mode is based at least in part on the determined ambient temperature.

5. The vehicle of claim 1, wherein the processing circuitry is further configured to:
determine that a humidity level of air in an interior of the vehicle exceeds a threshold;
identify a desired humidity level associated with the drying mode;
retrieve the parameter of the HVAC system by retrieving, based on the desired humidity level, at least one of a temperature setpoint or an flow rate setpoint for air to be output by the HVAC system during the drying mode; and
cause the HVAC system to activate the drying mode to direct thermal energy by outputting air in accordance with at least one of the temperature setpoint or the air flow rate setpoint, to reduce the humidity level of the air in the interior of the vehicle and to dry a material at the particular portion over a time period.

6. The vehicle of claim 1, wherein the processing circuitry is further configured to:
determine one or more ambient conditions;
retrieve the parameter of the HVAC system by retrieving, based on the determined one or more ambient conditions, a temperature setpoint and a humidity setpoint; and
cause the HVAC system to activate the drying mode to direct thermal energy by applying the temperature setpoint and the humidity setpoint.

7. The vehicle of claim 1, wherein:
the processing circuitry is configured to, in response to receiving selection of a first option, cause the HVAC system to activate the drying mode by directing thermal energy to feet of the user to dry socks or shoes of the user; and
the processing circuitry is configured to, in response to receiving selection of a second option, cause the HVAC system to activate the drying mode by directing thermal energy to a chest of the user to dry a jacket or shirt of the user.

8. A heating, ventilation, and air conditioning (HVAC) system of a vehicle, comprising:
memory;
processing circuitry configured to:
receive, over a network, weather information indicating that precipitation is occurring in an environment external to the vehicle;
based on the received weather information, cause display of an option related to a drying mode;
based on receiving selection of the option, determine to enter the drying mode;
retrieve a parameter of the HVAC system for the drying mode, wherein the parameter is stored in the memory; and
cause the HVAC system to activate the drying mode to direct thermal energy to a particular portion of the vehicle based on the retrieved parameter.

9. The HVAC system of claim 8, wherein;
the processing circuitry is further configured to determine, based on a received sensor input, that a seat of the vehicle is wet;
the particular portion of the vehicle comprises the seat; and
the processing circuitry is configured to cause the HVAC system to activate the drying mode to direct thermal energy by using the seat of the vehicle to direct the thermal energy.

10. The HVAC system of claim 8, wherein the processing circuitry is further configured to:
determine that a user of the vehicle was exposed to the precipitation; and
determine to enter the drying mode further in response to determining that the user was exposed to the precipitation.

11. The HVAC system of claim 8, wherein:
the processing circuitry is further configured to determine an ambient temperature outside the vehicle;
the particular portion of the vehicle is at least one of:
a seat of the vehicle, or
a region of the vehicle that is in front of the seat and below a top of a seat cushion of the seat;
the parameter corresponds to a temperature setpoint of the thermal energy directed to the particular portion of the vehicle; and
the temperature setpoint of the thermal energy directed to the particular portion of the vehicle during the drying mode is based at least in part on the determined ambient temperature.

12. The HVAC system of claim 8, wherein the processing circuitry is further configured to:
determine that a humidity level of air in an interior of the vehicle exceeds a threshold;
identify a desired humidity level associated with the drying mode;
retrieve the parameter of the HVAC system by retrieving, based on the desired humidity level, at least one of a temperature setpoint or a flow rate setpoint for air to be output by the HVAC system during the drying mode; and
cause the HVAC system to activate the drying mode to direct thermal energy by causing the HVAC system to output air in accordance with at least one of the temperature setpoint or the air flow rate, to reduce the humidity level of the air in the interior of the vehicle to the desired humidity level and to dry a material at the particular portion over a time period.

13. The HVAC system of claim 8, wherein the processing circuitry is further configured to:
determine one or more ambient conditions;
retrieve the parameter of the HVAC system by retrieving, based on the determined one or more ambient conditions, a temperature setpoint and a humidity setpoint; and
cause the HVAC system to activate the drying mode to direct thermal energy by applying the temperature setpoint and the humidity setpoint.

14. The HVAC system of claim 8, wherein:
the processing circuitry is further configured to determine to enter the drying mode in response to receiving a user request to enter the drying mode by receiving selection of one or more of the options;
the processing circuitry is configured to, in response to receiving selection of a first option, cause the HVAC system to activate the drying mode by directing thermal energy to feet of the user to dry socks or shoes of the user; and
the processing circuitry is configured to, in response to receiving selection of a second option, cause the HVAC system to activate the drying mode by directing thermal energy to a chest of the user to dry a jacket or shirt of the user.

15. A method comprising:
receiving sensor data from a sensor of a vehicle, wherein the sensor is configured to detect water on a windshield of the vehicle;
determining, based on sensor data received from the sensor, that precipitation is occurring in an environment external to the vehicle;
in response to the determining, causing display of an option related to a drying mode;
based on receiving selection of the option, determining to enter the drying mode in a vehicle;
retrieving a parameter of a heating, ventilation, and air conditioning (HVAC) system of the vehicle for the drying mode; and
causing the HVAC system to activate the drying mode to direct thermal energy to a particular portion of the vehicle based on the retrieved parameter.

16. The method of claim 15, wherein the particular portion of the vehicle comprises a seat, the method further comprising:
determining, based on a received sensor input, that the seat of the vehicle is wet; and
causing the HVAC system to activate the drying mode to direct thermal energy by using the seat of the vehicle to direct the thermal energy.

17. The method of claim 15, further comprising:
determining that a user of the vehicle was exposed to the precipitation; and
determining to enter the drying mode further in response to determining that the user was exposed to the precipitation.

18. The method of claim 15, further comprising:
determining an ambient temperature outside the vehicle, and wherein:
the particular portion of the vehicle is at least one of:
a seat of the vehicle, or
a region of the vehicle that is in front of the seat and below a top of a seat cushion of the seat;
the parameter corresponds to a temperature setpoint of the thermal energy directed to the particular portion of the vehicle; and
the temperature setpoint of the thermal energy directed to the particular portion of the vehicle during the drying mode is based at least in part on the determined ambient temperature.

19. The method of claim 15, further comprising:
determining that a humidity level of air in an interior of the vehicle exceeds a threshold;
identify a desired humidity level associated with the drying mode;
retrieving the parameter of the HVAC system by retrieving, based on the desired humidity level, at least one of a temperature setpoint or a flow rate setpoint for air to be output by the HVAC system during the drying mode; and
causing the HVAC system to activate the drying mode to direct thermal energy by causing the HVAC system to output air in accordance with at least one of the temperature setpoint or the air flow rate setpoint, to reduce the humidity level of the air in the interior of the vehicle to the desired humidity level and to dry a material at the particular portion over a time period.

20. The vehicle of claim 1, wherein:
the sensor data is first sensor data received at a first time; and
the processing circuitry is configured to:
further in response to determining, based on the first sensor data, that precipitation is occurring in the environment external to the vehicle, automatically enter the drying mode at a second time, prior to receiving the selection of the option, wherein:
while the drying mode is activated based on having been activated at the second time, the selection of the option is received, wherein the option specifies whether the drying mode should be automatically entered at future times when precipitation is determined to be occurring; and
perform the determination to enter the drying mode, based on receiving the selection of the option, further based on determining that second sensor data received from the sensor at a third time later than the second time indicates that precipitation is occurring in the environment external to the vehicle.

* * * * *